(12) United States Patent
Hatanaka

(10) Patent No.: US 7,586,954 B2
(45) Date of Patent: Sep. 8, 2009

(54) COMMUNICATION SYSTEM

(75) Inventor: Toshihiko Hatanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 680 days.

(21) Appl. No.: 11/410,934

(22) Filed: Apr. 26, 2006

(65) Prior Publication Data

US 2007/0133612 A1 Jun. 14, 2007

(30) Foreign Application Priority Data

Dec. 9, 2005 (JP) ............................. 2005-355904

(51) Int. Cl.
*H04J 3/06* (2006.01)
(52) U.S. Cl. .................. 370/503; 370/401; 375/354
(58) Field of Classification Search ................ 370/503, 370/504, 401, 304, 509, 510, 512, 513; 375/354, 375/355, 356, 357, 359; 709/248
See application file for complete search history.

(56) References Cited

U.S. PATENT DOCUMENTS

| | | | |
|---|---|---|---|
| 2005/0013394 A1 | 1/2005 | Rausch et al. | |
| 2005/0141565 A1* | 6/2005 | Forest et al. | 370/503 |
| 2006/0083265 A1* | 4/2006 | Jordan et al. | 370/503 |
| 2007/0033294 A1* | 2/2007 | Ungermann et al. | 709/248 |
| 2007/0094528 A1* | 4/2007 | Fredriksson et al. | 713/375 |
| 2007/0286225 A1* | 12/2007 | Enders et al. | 370/438 |

FOREIGN PATENT DOCUMENTS

DE 201 21 466 U1 4/2003

OTHER PUBLICATIONS

FlexRay Communications Systems Protocol Specification, Version 2.1, May 12, 2005, pp. 1-12, 141-243.

* cited by examiner

*Primary Examiner*—Ricky Ngo
*Assistant Examiner*—Gary Mui
(74) *Attorney, Agent, or Firm*—Sughrue Mion, PLLC

(57) ABSTRACT

In a communication system where a terminal operates in clock synchronization with a global time used on a network, a period of time required for establishing clock synchronization when the terminal synchronizes a local time with a global time prior to receiving or transmitting a frame. In the communication system where the terminal operates in clock synchronization with the global time used on the network, a normal frame is utilized as a sub-startup frame (A_su) for global time reference in addition to a startup frame (A_st), to thereby reduce the period of time required for establishing clock synchronization. Also, the reference auxiliary startup frame is set as an event signal to adaptively control a period of time that is occupied by the transmission of the reference frame.

18 Claims, 28 Drawing Sheets

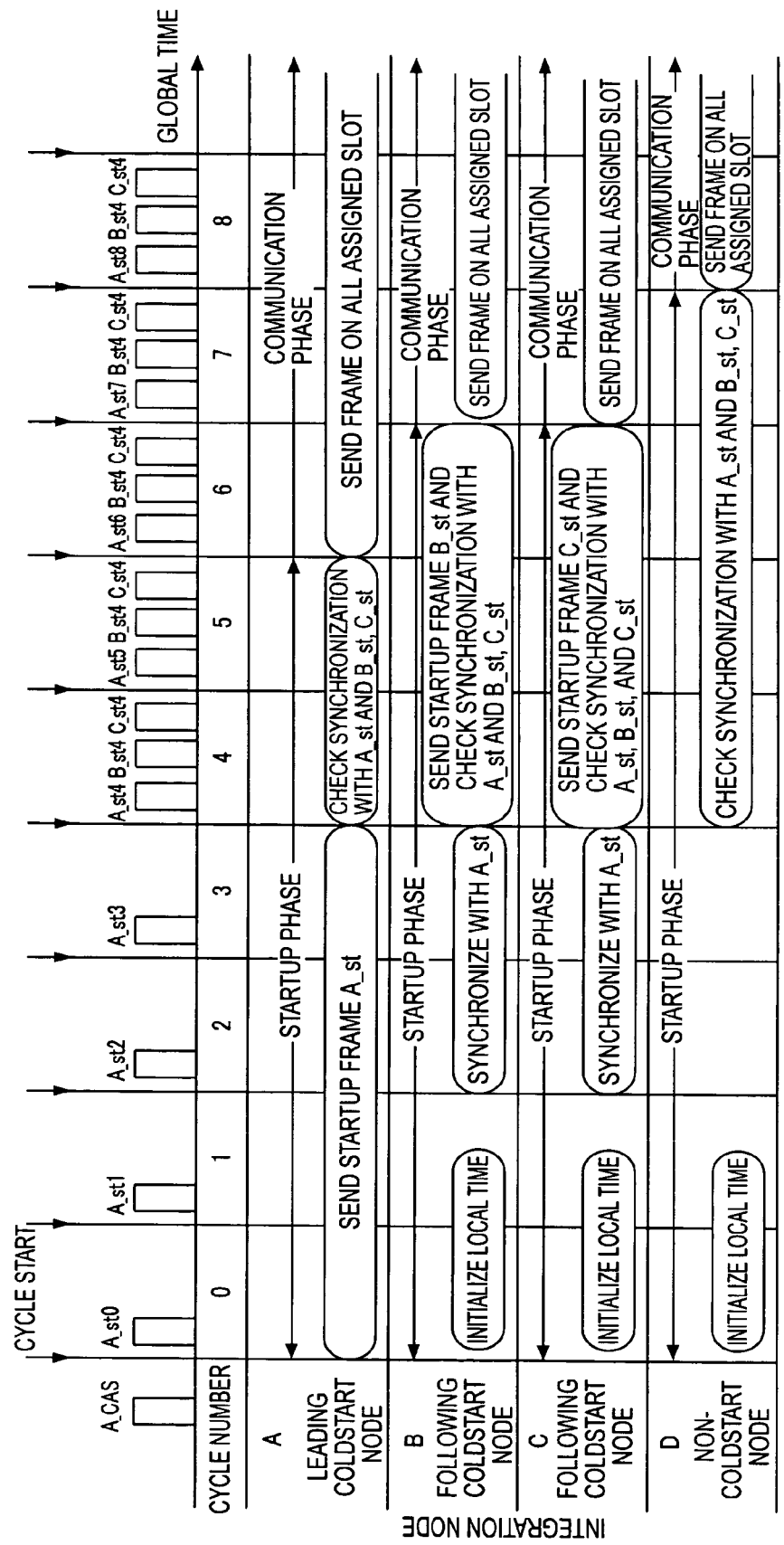

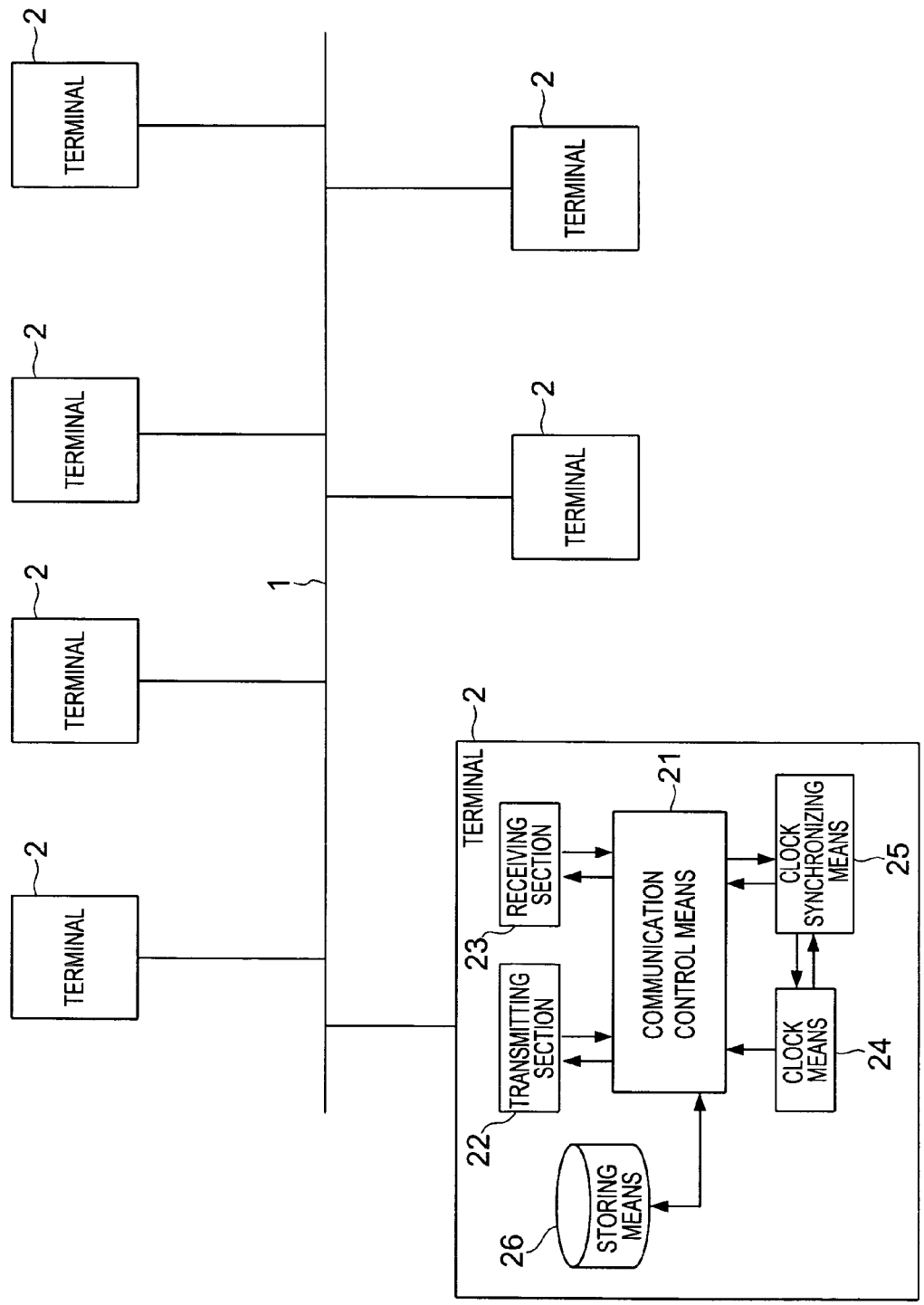

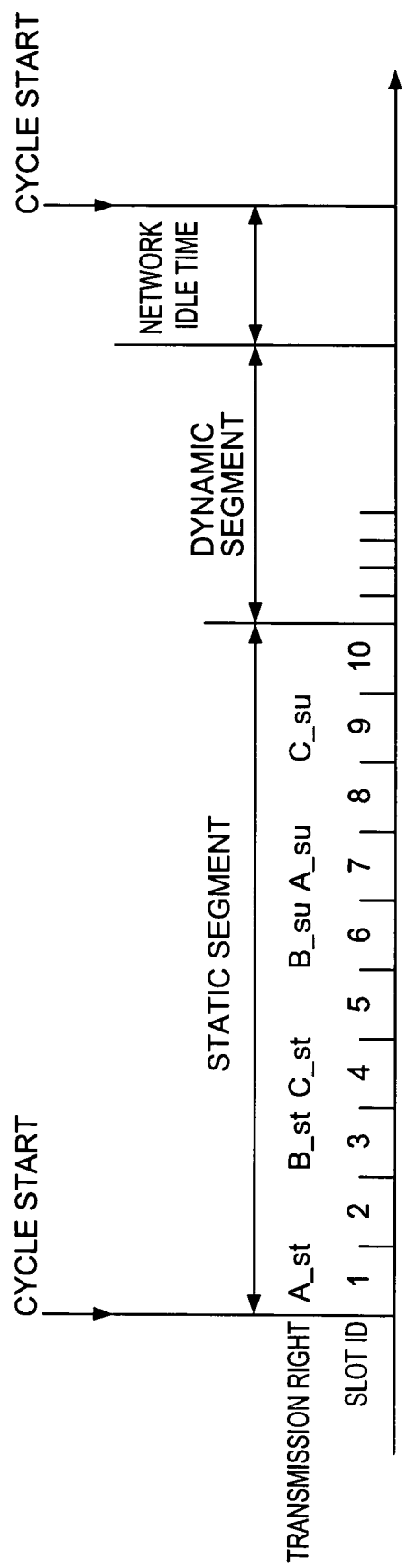

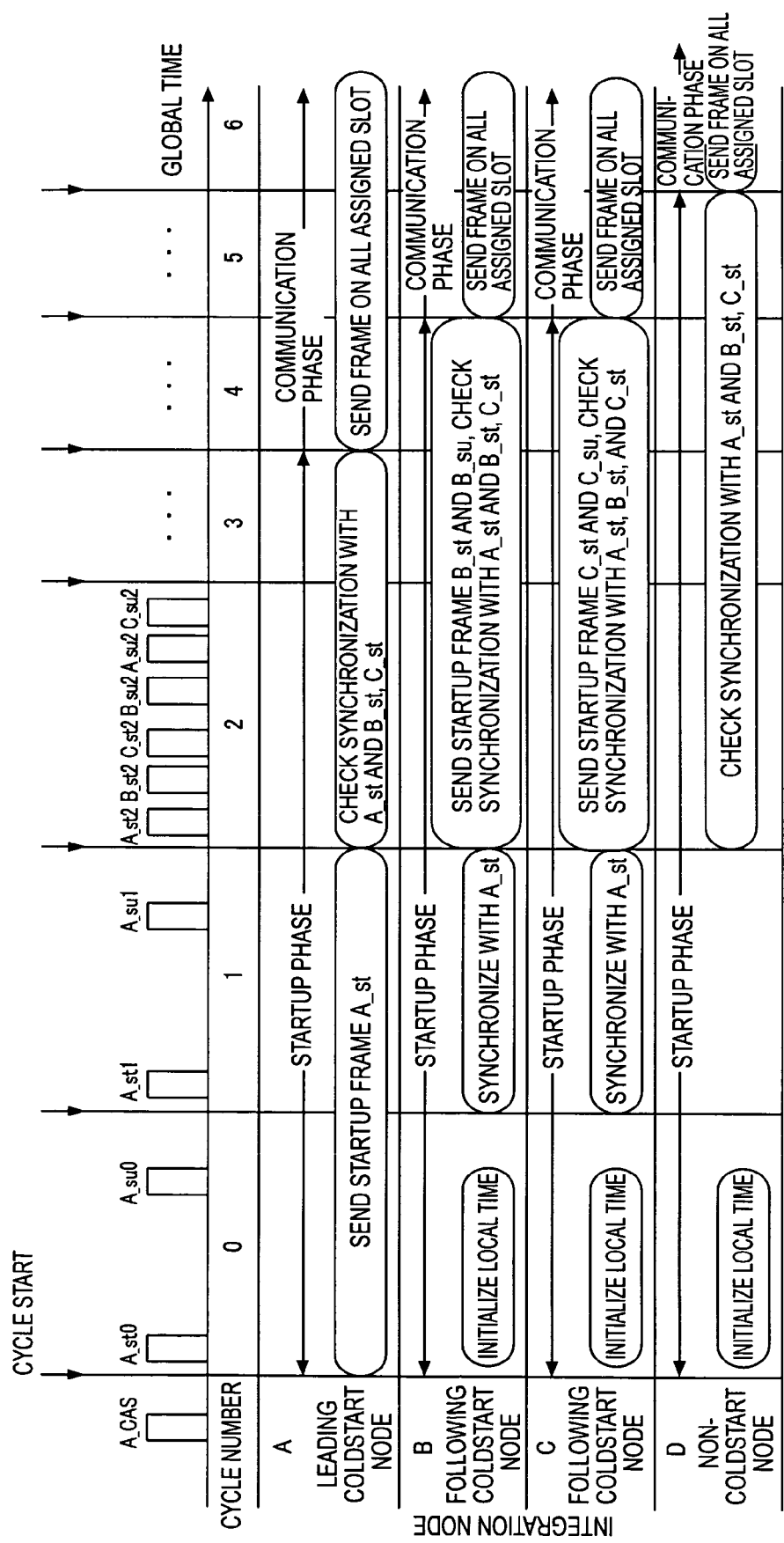

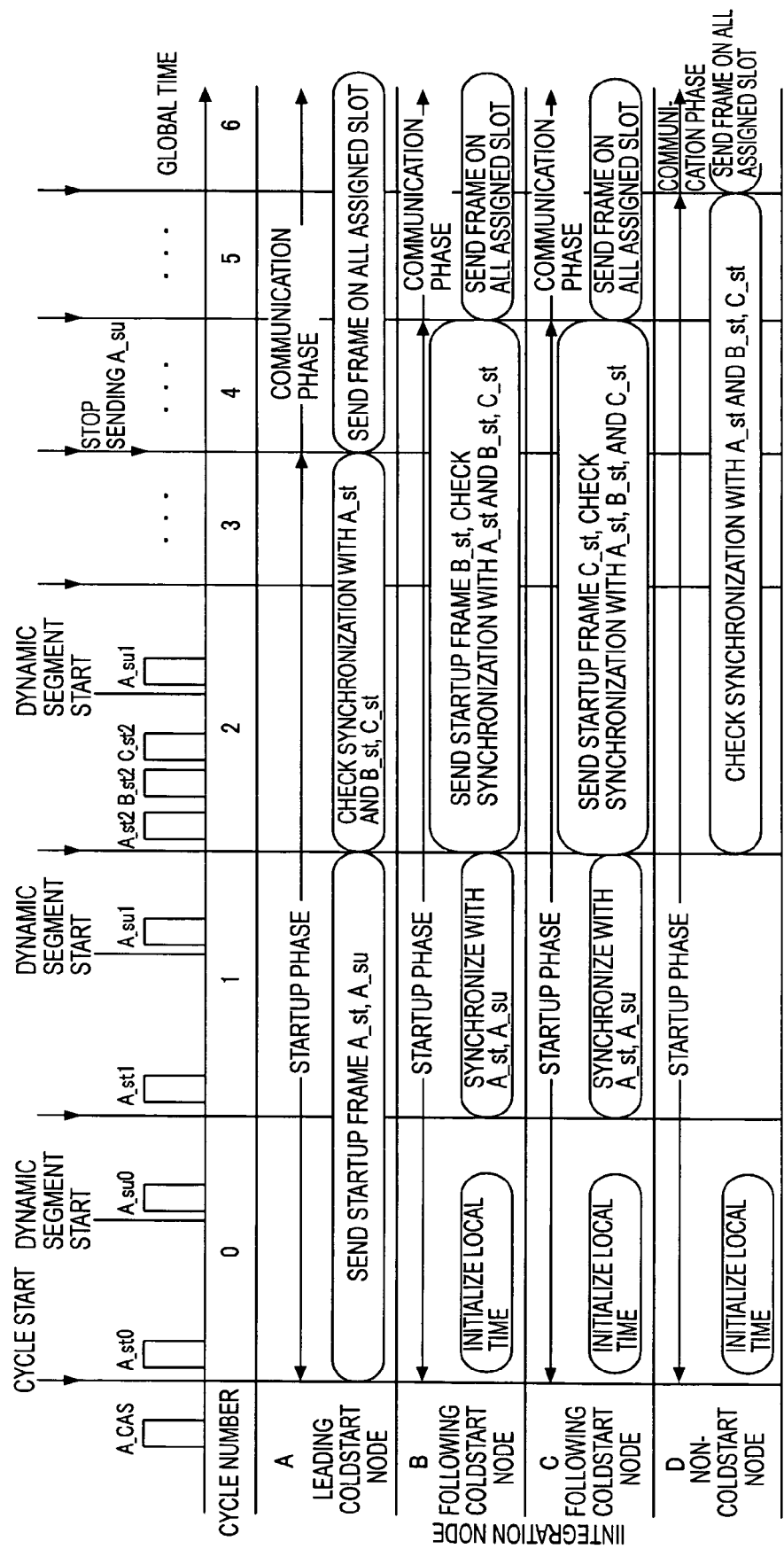

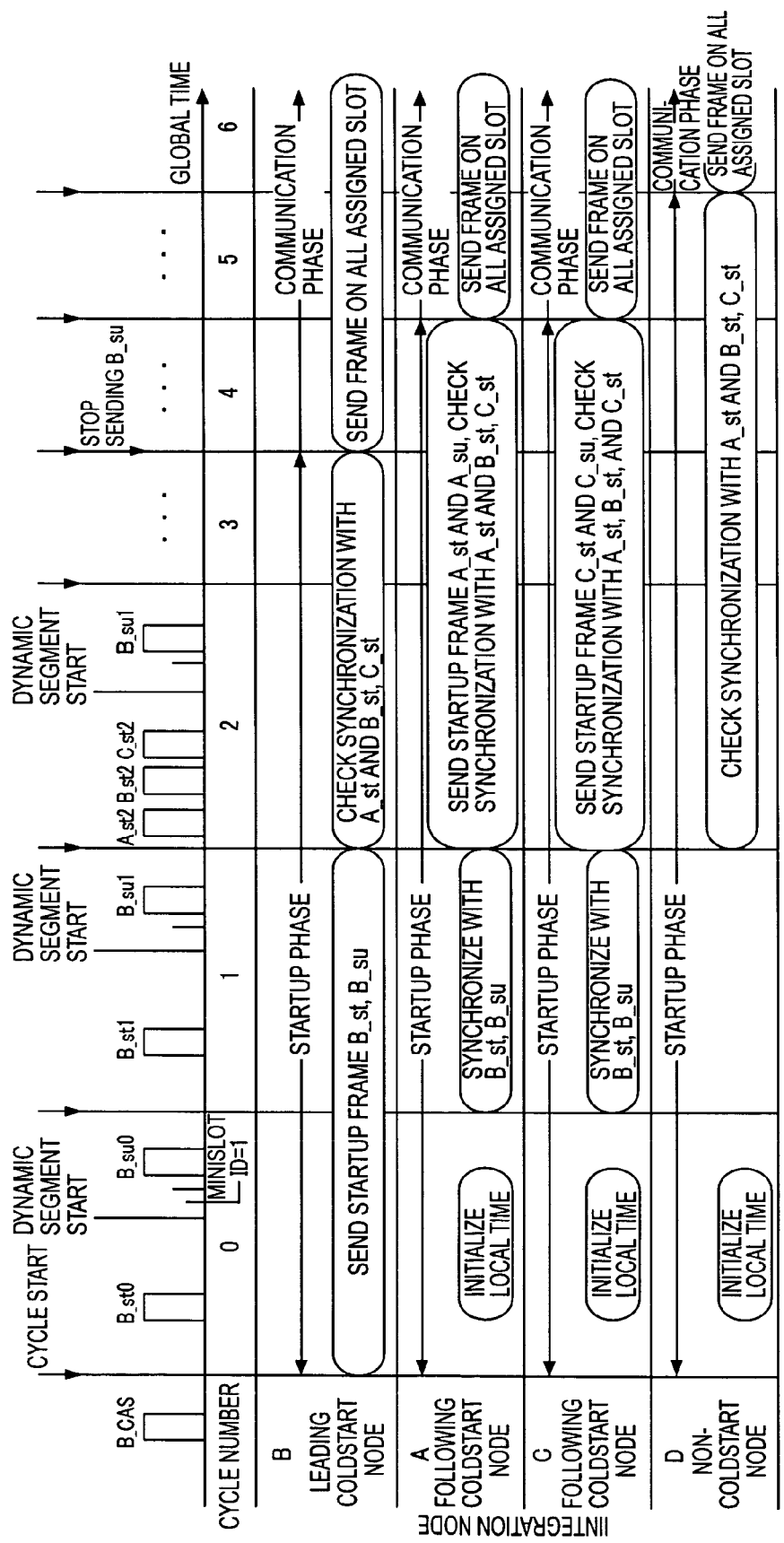

COMMUNICATION SYSTEM

BACKGROUND OF THE INVENTION

1. Field of the Invention

The present invention relates to a communication system in which plural terminals that are connected to each other through transmission paths operate in clock synchronization with a global time which is used on a network formed of the transmission paths.

2. Description of the Related Art

In a communication system for transmitting and receiving frames among the plural terminals through the transmission paths, in particular, a communication system employed in a control device of an in-vehicle device or a production line, an attention has been paid to a time trigger system (hereinafter referred to as "TT system") which manages a frame transmission timing and a setting change timing by a time.

As a known TT system, there is a FlexRay (registered trademark) which is used in the network of an in-vehicle device. In this system, in the case where clock synchronization is established with respect to the global time that is used on the network to attempt the integration of the terminals into the network, the clock synchronization is conducted by a receiving time of a frame which is called "startup frame" that is transmitted from one or more terminals which have been already integrated into the network, and an estimated receiving time of the startup frame which is calculated from the communication schedule by a terminal that conducts the clock synchronization with the network (for example, refer to "FlexRay Communication System Protocol Specification Ver. 2.1").

In the above FlexRay, in the case where clock synchronization is attempted with respect to the global time that is used on the network, an estimated reception time of the startup frame is obtained by an initial communication cycle, the reception time of the startup frame is obtained by a subsequent communication cycle. Then, a local time is initialized by the reception time and the estimated reception time. Further, when the local time has been completely initialized in a startup phase, an initial clock is adjusted by the reception time and the estimated reception time of the startup frame in two subsequent continuous communication cycles. Incidentally, in order to improve the transmission efficiency, a demand has been made to further shorten a period of time required to establish clock synchronization.

SUMMARY OF THE INVENTION

The present invention has been made in view of the above, and therefore an object of the present invention is to provide a communication system in which terminals operate in clock synchronization with a global time that is used on a network, which is capable of reducing a period of time required to establish a clock synchronization at the time when the terminals temporally synchronize the local times with the global time before transmitting and receiving the frames.

The present invention provides a communication system in which a plurality of terminals are connected to each other through a transmission path so as to establish a network, each of the terminals including: a transmitting section for transmitting a frame; a receiving section for receiving the frame; clock means for generating a local time inherent to the terminal; clock synchronizing means for calculating a reception time of the frame, an estimated reception time of the frame, and an initial value of the local time, and for adjusting a clock; storing means for storing a communication schedule that defines a transmission and reception procedure of the frame within a communication cycle of a given period and setting information related to the communication schedule; and communication control means for controlling the communication operation of the terminal by the transmitting section and the receiving section on the basis of the local time and the communication schedule, the communication control means in each of the terminals operates as a leading terminal that leads the communication schedule in a case where the terminal first starts the communication among the plurality of terminals, and operates as an integration terminal that conducts the integration into the network in other cases in a startup phase where the network is established; in a case where the terminal is the leading terminal, the communication control means in each of the terminals transmits the sub-startup frame in the same communication cycle at a timing when the estimated reception time can be calculated due to the startup frame for the global time reference and the communication schedule stored in the integration terminal at a transmission timing defined by the communication schedule in advance, after starting the communication schedule with the local time as the global time used on the network; in a case where the terminal is the integration terminal, the communication control means in each of the terminals receives the startup frame and the sub-startup frame, and starts the communication schedule by the local time according to an initial value of the local time calculated from the reception time of the startup frame, the reception time of the sub-startup frame, and the estimated reception time; and the clock synchronizing means calculates the initial value of the local time according to the reception time of the startup frame, and the reception time and the estimated reception time of the sub-startup frame.

In the present invention, the period of time required for establishing the clock synchronization at the time when the terminals temporally synchronize the local times with the global time before transmitting and receiving the frames can be reduced.

BRIEF DESCRIPTION OF THE DRAWINGS

In the accompanying drawings:

FIG. 3 is a timing chart showing a startup phase of the communication cycle in the general FlexRay;

FIG. 6 is a diagram showing an example of the structure of a communication system according to the present invention;

FIG. 7 is a diagram showing an example of the communication schedule in one cycle of the communication system according to the present invention;

FIG. 8 is a timing chart showing an example of the communication cycle of the communication system according to a first embodiment of the present invention;

FIG. 13 is a timing chart showing an example of the communication cycle of the communication system according to a second embodiment of the present invention;

FIG. 15 is a timing chart showing another example of the communication cycle in the communication system according to the second embodiment of the present invention;

DETAILED DESCRIPTION OF THE PREFERRED EMBODIMENTS

Before the respective embodiments of the present invention are described, a communication system of this type on the basis of which the present invention has been made will be generally described with reference to FlexRay. Because the communication protocol of FlexRay is a known technique, the details not directly related to the present invention will be omitted from the description.

Figure 1:
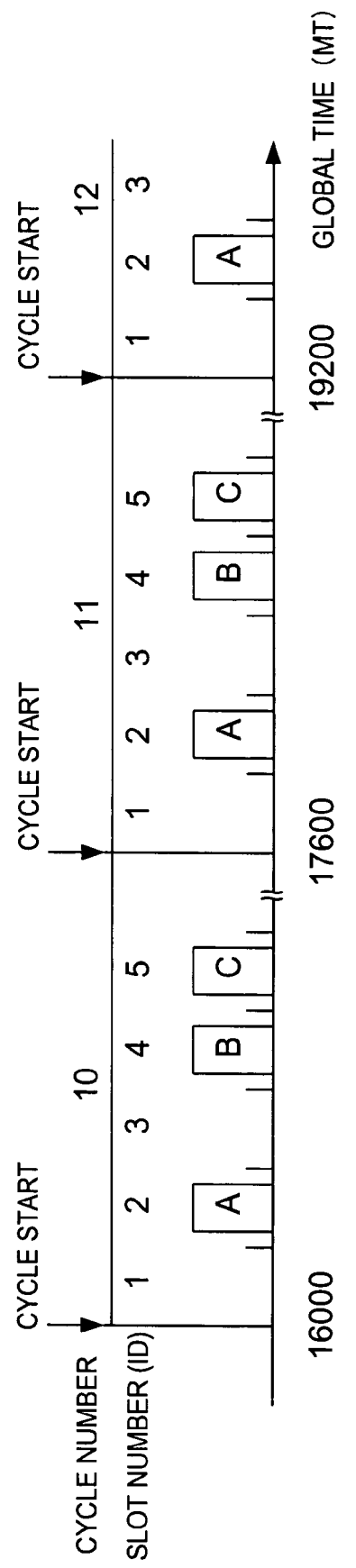
FIG. 1 is a diagram showing an example of a communication pattern in a communication system using a communication schedule, a communication cycle, and a time slot based on a FlexRay.

In FlexRay, the transmission and reception of each of frames (packets/messages) are conducted on the basis of time slots into which a communication cycle having a predetermined length has been divided, and a transmission right in each of the time slots is stipulated by the communication schedule. FIG. 1 shows an example of a communication pattern in a communication system using a communication schedule, a communication cycle, and a time slot. For example, in FIG. 1, the transmission right of the frames is given to a terminal A at the time of slot number (ID)=2, a terminal B at the time of slot number (ID)=4, and a terminal C at the time of slot number (ID)=5.

Figures 2A, 2B:
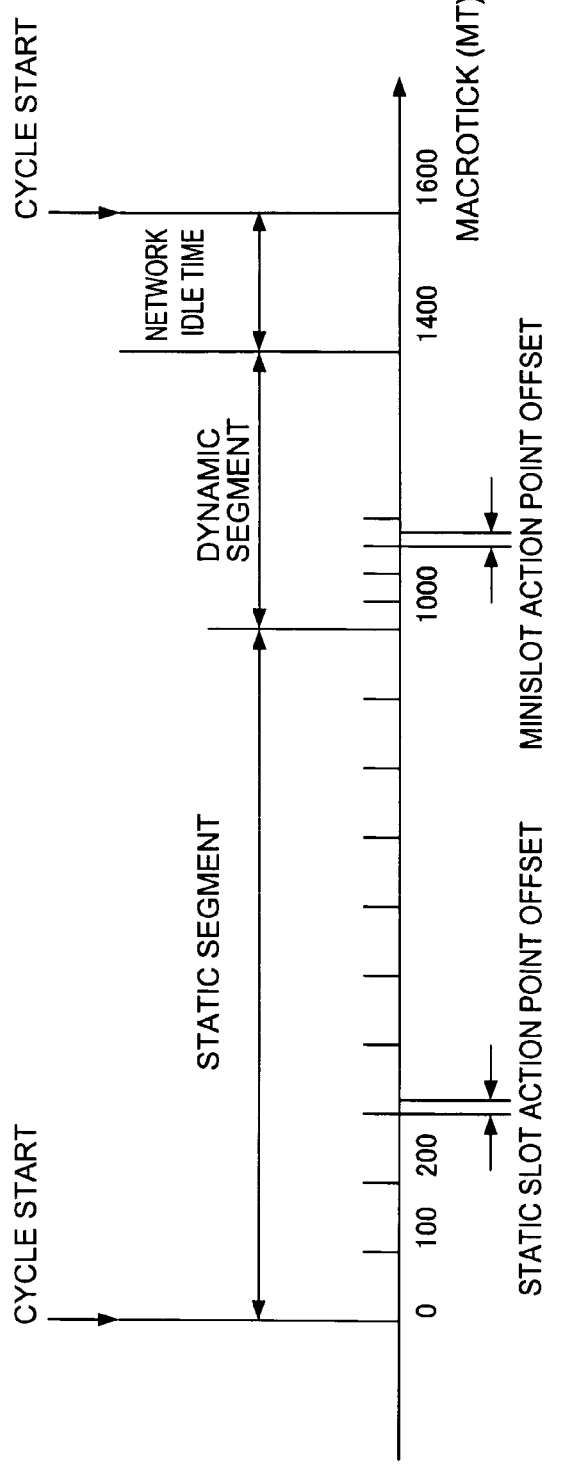
FIGS. 2A and 2B are diagrams showing the communication schedule in one cycle of a general FlexRay and the respective parameters of the communication schedule.

Also, FIG. 2A shows the structure (communication schedule) in one cycle of the communication pattern of FlexRay, and FIG. 2B shows the respective parameters (setting information related to the communication schedule) of the pattern shown in FIG. 2A. One cycle includes a static segment, a dynamic segment, and a network idle time. Reference MT denotes a time length based on macrotick, and μT is a time length based on microtick.

In order to transmit the frame, it is necessary that the terminals establish clock synchronization and are integrated into the network. In the case of conducting a communication on the basis of the communication cycle or the time slot, it is essential to establish the clock synchronization, and the frame transmission of the terminal that does not establish the clock synchronization is prohibited in order to prevent the collision of frames. In FlexRay, a local time is adjusted to a global time that is used on the network to establish the clock synchronization.

In this example, in the case where the transmission efficiency of the communication system is taken into consideration, a period of time during which the terminals cannot transmit the frames causes a reduction in the transmission efficiency. For that reason, in FlexRay, a period of time required for establishing the clock synchronization is reduced, thereby making it possible to improve the transmission efficiency.

In FlexRay, in the case where the terminal that does not establish the clock synchronization establishes the clock synchronization and is integrated into the network, the clock synchronization is conducted by using a reception time of the frame which is called "startup frame" which is transmitted from one or more terminals that have been completely integrated into the network, and an estimated reception time of the startup frame which is calculated from the communication schedule by a terminal that conducts clock synchronization with the network. In FlexRay, processing related to the clock synchronization can start in only even communication cycles. This is because the global time is updated by a clock adjustment in the even communication cycles. In FlexRay, it is unnecessary that the global time and the local time perfectly coincide with each other, and the clock synchronization is allowed within a permissible error range. The permissible error range can be freely set on the basis of a specified value by a designer of the network.

In this example, the network of FlexRay is exemplified. However, for simplification of description, the common network configuration and communication schedule are employed. The network configuration and communication schedule of FlexRay in this example will be described below.

Terminals that can be connected to the network include four terminals of A, B, C, and D.

The terminals A, B, and C are coldstart nodes.

The terminal D is a non-coldstart node.

The terminal A is preferably a leading coldstart node.

The communication cycle is configured as shown in FIG. 3.

The coldstart means a communication start from a state in which a communication is not conducted on the network.

The respective parameters shown in FIG. 2B are stipulated by the communication schedule, and the communication schedule and the respective various parameters shown in FIGS. 2A and 2B are stored in a communication control section or a memory section in all of the terminals that can be connected to the network. Also, in this example, for convenience, a clock adjustment that is conducted by using a startup frame which is transmitted from a certain terminal is called "startup clock adjustment" in the case where the clock adjustment is required to particularly distinguish from a clock adjustment that is conducted by using the startup frames which are transmitted from the plural terminals.

In a startup phase where the network is established from the plural terminals, the terminals are roughly classified into two groups from the viewpoint of the respective roles. One group is leading coldstart nodes that start the communication schedule with their own local times as the global time, and another group is integration nodes that conduct integration into the network in clock synchronization with the global time.

In the network of FlexRay, in the startup phase, two or more coldstart nodes which are capable of performing the roles of the leading coldstart nodes are required. The coldstart nodes are terminals that are capable of transmitting the startup frames, and one coldstart node has a transmission right of the startup frame by only a one-hour slot per one communication cycle. A node, that is, a terminal which first starts the communication schedule among the plural coldstart nodes is the leading coldstart node, and other coldstart nodes become integration nodes that conduct clock synchronization with the global time, which are also particularly called "following coldstart nodes" in order to distinguish from the non-coldstart node.

Figure 4A:
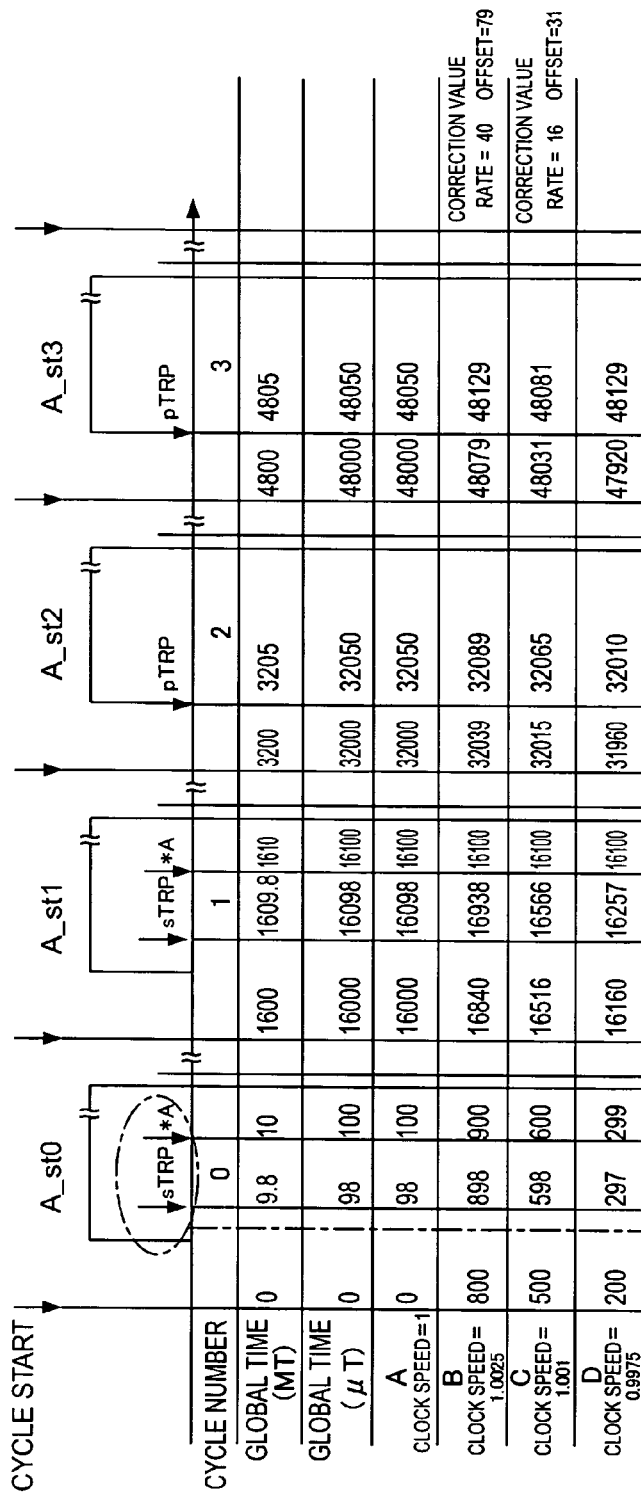
FIGS. 4A and 4B are diagrams showing the details of cycles 0 to 3 in FIG. 3.
Figure 4B:
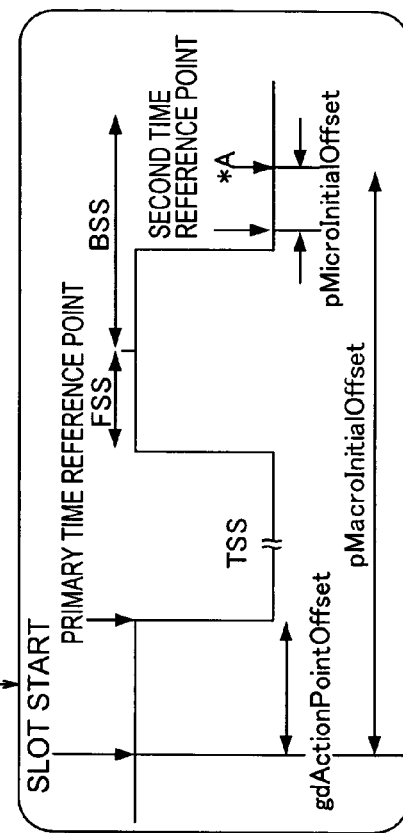

FIG. 3 is a timing chart of the communication cycle showing an example in which the clock synchronization is established with the terminal A as the leading coldstart node, and the terminals B, C, and D as the integration nodes (terminals B and C are the following coldstart nodes) to establish the network. Also, FIG. 4A shows the details of the clock integration in cycles 0 to 3 shown in FIG. 3, in which the global time and the respective local times of the terminals A, B, C, and D are indicated from the cycle 0. FIG. 4B is an enlarged diagram of FIG. 4A. The pMacroInitialOffset and pMicroInitialOffset shown in FIG. 4B is set in the value according to the characteristics of the respective terminals. However, for simplification, the pMacroInitialOffset=10 MT and pMicroInitialOffset=2 µT are set in all of the terminals.

In association with FIGS. 2A, 2B and 4A, 4B, FlexRay uses two types of timers including macrotick and microtick that is a unit smaller than that of macrotick. Reference MT denotes a time length based on macrotick, and µT is a time length based on microtick.

It is assumed that the local times of the terminals B, C, and D are set to 800 µT, 500 µT, and 200 µT at the time of the global time=0 (the local times can be perceived at the timing of the cycle startup time in each of the terminals). Also, it is assumed that the clocks of the terminals A, B, C, and D are advanced at the rates of 1 time, 1.0025 times, 1.001 times, and 0.9975 times with respect to a nominal value. Because the maximum clock frequency deviation that is defined by FlexRay is 0.0015, the permissible error range of the clock rate is set to 0.9985 to 1.0015. For that reason, although the errors of the terminals B and D exceed the permissible range, the errors that are larger than the specified values are given to the terminals B and D in order to confirm the accuracy of the clock synchronization.

First, each of the coldstart nodes (terminals A, B, and C) measures a period of time during which the frames and the symbols are not transmitted on the transmission path. When a timer value that is set in each of the terminals expires, after each of the coldstart nodes transmits CAS (collision avoidance symbol) for avoiding a collision, the coldstart node starts the communication schedule as the leading coldstart node (terminal A) with its own clock as the global time. The coldstart nodes (terminals B and C) that have detected CAS before the timer values have expired become the integration nodes.

<Initialization of Local Time>

The leading coldstart node (terminal A) transmits a startup frame (A_st) in a time slot (slot 1) which is defined by the communication schedule. The integration nodes (terminals B, C, and D) first observe the transmission paths until those integration nodes receive the startup frames in even communication cycles. When those integration nodes succeed in receiving the startup frame (A_st0) in an even communication cycle (cycle 0), the integration nodes calculate the reception times of the startup frames. At this stage, a second time reference point sTRP shown in FIG. 4 is used. The local times L_node at sTRP of the terminals B, C, and D are L_B=898 µT, L_C=598 µT, and L_D=297 µT. Time windows are set near times (Tw_B=16898 µT, Tw_C=16598 µT, Tw_D=16297 µT) resulting from adding a communication cycle length (16000 µT) which is defined by the communication schedule to the times of sTRP.

Also, the initial value L_ini of the local time is set by the following expression:

$$L\_ini = (\text{cycle count}+1)*\text{cycle length}+(\text{slot count}-1)*\text{slot length}+\text{pMacroInitialOffset}$$

where cycle count is the number of cycles, cycle length is the length of a cycle, slot count is the number of slots, slot length is the length of a slot, and pMacroInitialOffset is a p macro initial offset.

Because it is assumed that pMacroInitialOffset is 10 MT (=100 µT) at all of the terminals, all of the initial values of the terminals B, C, and D are represented as follows:

$$L\_ini = 1*16000+(1-1)*100+100 = 16100\ (\mu T)$$

In a subsequent odd communication cycle (cycle 1), when the integration nodes (terminals B, C, and D) detect sTRP of the startup frame (A_st1) which is transmitted by the leading coldstart node within the time window which has been set in the cycle 0, the integration nodes start the timers of pMicroInitialOffset. The pMicroInitialOffset is a period of time until a startup time *A of the macrotick that is nearest to sTRP since a time of sTRP. When the timers expire, the integration nodes initialize the local times by the initial value L_ini=16100 µT which has been set in the cycle 0, and then starts the communication schedule.

<Initial Clock Adjustment>

In two subsequent communication cycles (cycles 2 and 3), the following coldstart nodes (terminals B and C) adjust the initial clock according to a difference between the reception times of the startup frames (A_st2, A_st3) which are transmitted from the leading coldstart node (terminal A) and estimated reception times which are calculated by the communication schedule. The clock adjustment is conducted by a rate correction that adjusts an advance rate of the local time with respect to an advance rate of the global time, and an offset correction that adjusts a startup time of the cycle.

Different from the cycles 0 and 1 where the initial values of the local times are set, a primary time reference point (pTRP) which is a calculated value of the startup edge of the frame is used as the reception time in the clock adjustment. The pTRP is obtained from a time Ts of sTRP by the following expression:

pTRP=Ts+pMicroInitialOffset−pMacroInitialOffset+
    gdActionPointOffset

Also, as the estimated reception time, there is used a time resulting from adding a gdActionPointOffset to the startup time of the slot which is assigned to the startup frame.

First, the rate correction will be described. Since there is no difference in a procedure of calculating the adjusted value in the rate correction among the terminals, a detailed value of the terminal B will be described.

In FIG. 4, differences (D_cycle) between the reception times of the startup frames (A_st2, A_st3) in the cycles 2 and 3 and the estimated reception times are D_2=32089−32050=39 µT and D_3=48129−48050=79 µT, respectively. Thus, there occurs a difference of 40 µT per one communication cycle. From that fact, it is found that the microtick of the terminal B is counted at a rate of 16040/16000=1.0025 times of the microtick of the global time. When the terminal B sets the number of microtics per one communication cycle to 16040 µT, the terminal B is capable of adjusting the rate of the local time to the rate of the global time. The rate adjusted value thus calculated is applied from the subsequent communication cycle (cycle 4).

Subsequently, the offset correction will be described. Since there is no difference in a procedure of calculating the adjusted value in the offset correction, a detailed value of the terminal B will be described.

In the offset correction, a difference D_3 between the reception time and the estimated reception time of the startup frame (A_st3) in cycle 3 is used. It is presumed from D_3 that the subsequent communication cycle startup time of the terminal B starts earlier than the communication cycle startup time of the global time by 79 µT. Under the circumstance, the time of NIT (network idle time) in the cycle 3 is lengthened by 79 µT, to thereby adjust the communication cycle start time.

Now, a time lag between the local time and the global time of the terminal B after the initial clock adjustment is studied. As a result of applying the offset correction, the startup time T_4 of the terminal B in the cycle 4 becomes 64079 µT at the local time. When that time is replaced with the global time, T_4 is represented by the following expression:

T_4=16100+(64079−16100)/
    1.0025=63959.35→about 63959 µT

It is found that a difference of 41 µT remains as compared with the startup time in the cycle 4 at the global time. On the other hand, as a result of applying the rate correction, the rate of the local time at the terminal B is equal to the rate of the global time. For that reason, the relationship between the local time and the global time of the terminal B in the cycle 4 and the following cycles is represented by the following expression:

local time=global time+41

It is found that when the error is within a permissible range, the local time is synchronized with the global time.

Upon completion of the initial clock adjustment through the above procedure, the following coldstart nodes (terminals B and C) start to transmit the startup frames in the time slots which are defined by the communication schedule.

<Clock Adjustment>

In the cycle 4 and the following cycles, the startup frames are transmitted from the plural terminals (terminals A, B, and C), and the clock adjustments are conducted by using the reception times and the estimated reception times, respectively. The clock adjustments are not directly related to the present invention, and therefore will be omitted from the description.

Upon completion of the above-described <Initialization of Local Time>, <Initial Clock Adjustment>, and <Clock Adjustment>, the terminals establish the clock synchronization, and can complete the integration into the network.

In the case where the plural terminals establish the clock synchronization with the global time, and the integration nodes that do not establish the clock synchronization with the network on which the frames are transmitted conduct the integration into the network (integration phase), the integration nodes calculate the initial values of the local times on the basis of the startup frame which has been first received among the plural startup frames which are transmitted in the even communication cycles, and starts the communication schedule. For that reason, different from the procedure in the startup phase which is described in the item <Initialization of Local Time>, the integration nodes conduct the clock synchronization with one arbitrary node (leading integration node) among the plural coldstart nodes that have already established the clock synchronization.

Figure 5:
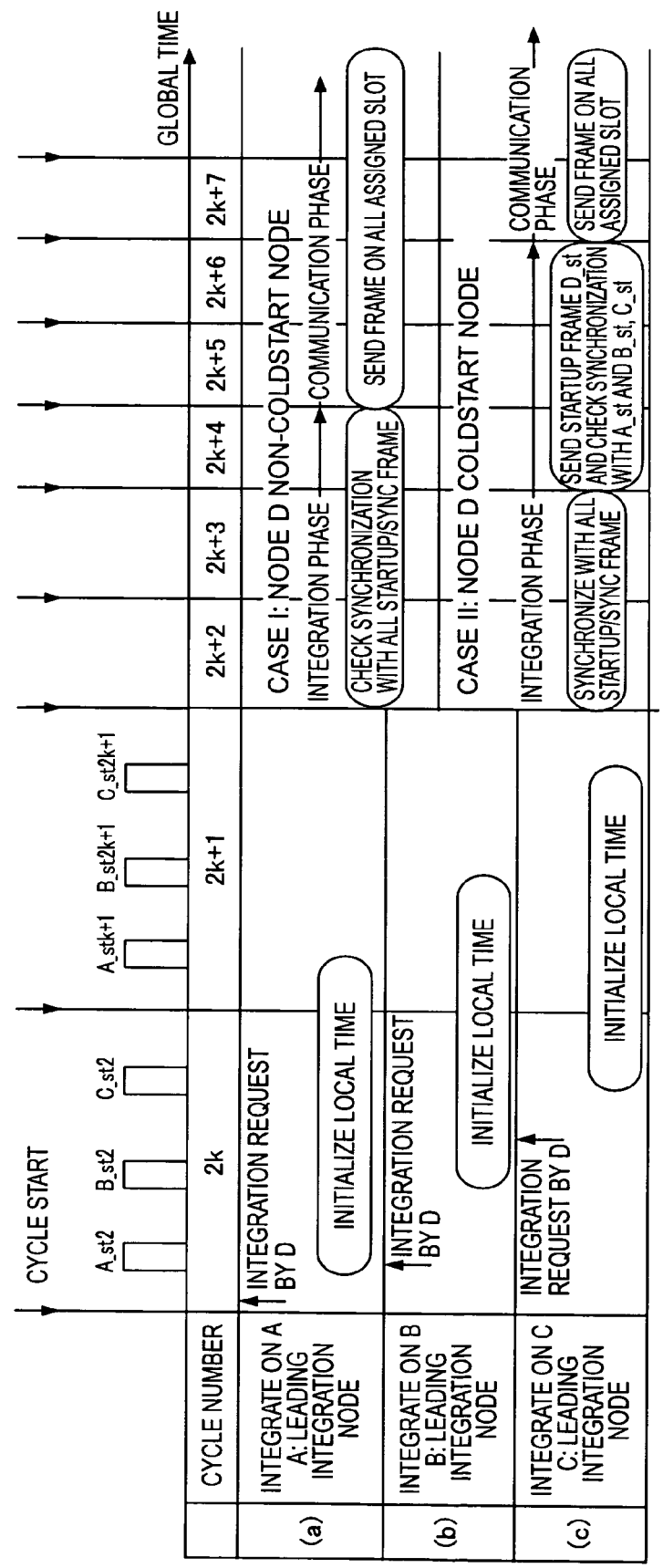
FIG. 5 is a timing chart showing an integration phase of the communication cycle of the general FlexRay.

FIG. 5 is timing charts of the communication cycles in the case where the terminals A, B, and C are the coldstart nodes, and the terminal D conducts the clock synchronization with the network on which three startup frames are transmitted within one communication cycle as the integration node, respectively.

A (a) in FIG. 5 shows a case in which the integration node (terminal D) first receives the startup frame which is transmitted from the terminal A in the even communication cycle (cycle 2k) (the terminal A is the leading integration node). In this case, the terminal D initializes the local times by the startup frames (A_st2k, A_st2k+1) which are transmitted from the terminal A in a cycle 2k and a cycle 2k+1 in the same calculating procedure as that in the item <Initialization of Local Time>, and then starts the communication schedule.

As in the case of (a) in FIG. 5, the integration node starts the communication schedule with the terminal B as the leading integration node in (b) in FIG. 5 and with the terminal C as the leading integration node in (c) in FIG. 5, respectively.

In the cycle 2k+2 and the subsequent cycles in FIG. 5, the integration node receives the startup frames and the synchronization frames (sync frame) from the plural terminals, and then conducts the clock adjustment by using the reception times and the estimated reception times, respectively. The clock adjustment will be omitted from the description. In a case 1 of FIG. 5, the local time is initialized in the case where the integration node (terminal D) is a non-coldstart node, and in a case 2 of FIG. 5, the local time is initialized in the case where the integration node (terminal D) is a coldstart node.

As described above, in the case where the clock synchronization with the global time is conducted in FlexRay, the local time is initialized by the reception time of the startup frame in the even communication cycle, and the reception time and the estimated reception time of the startup frame in the subsequent odd communication cycle. Also, when the following coldstart node has completely initialized the local time in the startup phase, the following coldstart node conducts the initial clock adjustment by the reception time and the estimated reception time of the startup frame in the two subsequent continuous communication cycles. For that reason, in both of the initialization of the local time and the initial clock adjustment, a demand is made that the estimated reception times of the startup frames can be calculated from the communication schedule.

In this example, in the case where a period of time required for the integration into the network is taken into consideration, as shown in FIG. 3, in order to shift from the startup phase to the communication phase, 6 cycles are required in the leading coldstart node, 7 cycles are required in the following coldstart node, and 8 cycles are required in the non-coldstart node. Also, as shown in FIG. 5, in order to shift from the integration phase to the communication phase, 3 cycles are required in the non-coldstart node, and 5 cycles are required in the coldstart node. As described above, in order to improve the transmission efficiency, a period of time required for the integration into the network should be reduced as much as possible.

As a method of reducing the period of time required for the integration into the network, there is used a method of enhancing the transmission frequency of I-frame having the global time as data within the frame in TTP/C (time triggered protocol SAE class C) that conducts a communication by the communication schedule. In TTP/C, the period of time required for the integration into the network can be reduced through the above method whereas, in FlexRay, the same method as that in TTP/C cannot be employed. This is because the transmission right of the startup frame is given during only a one-hour slot with respect to "1 coldstart node-1 communication cycle" in FlexRay. Also, in a method where the normal frame other than the startup frame which is transmitted by the coldstart node is used for the clock synchronization in addition to the startup frame, the communication schedule does not always define that another terminal within the network receives the frame. As a result, it is impossible to calculate the estimated reception time of the frame, and the period of time required for the integration into the network cannot be reduced by using the frame other than the startup frame.

Under the circumstances, description will be given of a case in which the present invention is applied to FlexRay as a preferred embodiment of the present invention. However, the applied scope of the present invention is a communication protocol having the features defined in the claims, and is not limited to FlexRay.

FIG. 6 shows an example of the structure of a communication system according to the present invention. In FIG. 6, plural terminals 2 which are nodes having substantially the same configuration are connected to a transmission path 1, respectively, to thereby establish the network. Each of the terminals 2 includes a transmitting section 22 and a receiving section 23 which communicate with another terminal, communication control means 21 for controlling the communication through the transmitting section 22 and the receiving section 23, clock means 24 for generating clocks for communication, clock synchronizing means 25 for conducting clock synchronization in communication, and storing means 26 for storing the communication schedule shown in FIGS. 2A and 2B and FIG. 7 which will be described later and various parameters thereof (setting information related to the communication schedule) therein. For example, the communication control means 21, the clock means 24, and the clock synchronizing means 25 are formed of, for example, one computer, and the storing means 26 is formed of a memory. Also, the storing means 26 may be incorporated into the computer together with other means. The communication control means 21, the clock means 24, the clock synchronizing means 25, and the storing means 26 constitute a communication control section.

Also, the terminal that is the coldstart node and the terminal that is the non-coldstart node are identical in the basic structure with each other, but different in the control by the communication control section 21 and the clock synchronizing means 25 from each other.

Also, the above-mentioned network configuration and communication schedule shown in FIGS. 3 and 4 are employed as the network configuration and communication schedule of FlexRay in the following embodiments.

First Embodiment

First, it is shown below that a system according to a first embodiment transmits a sub-startup frame in a static segment.

FIG. 7 is a diagram showing an example of the communication schedule in one cycle of the communication system according to the present invention. X_su in the figure represents a sub-startup frame of a terminal name X. As shown in FIG. 7, in each of the coldstart nodes, the time slot that transmits the startup frame and the sub-startup frame is defined by the communication schedule, and all of the terminals which can be connected to the network are defined by the communication schedule so as to receive all of the sub-startup frames.

Figure 9A:
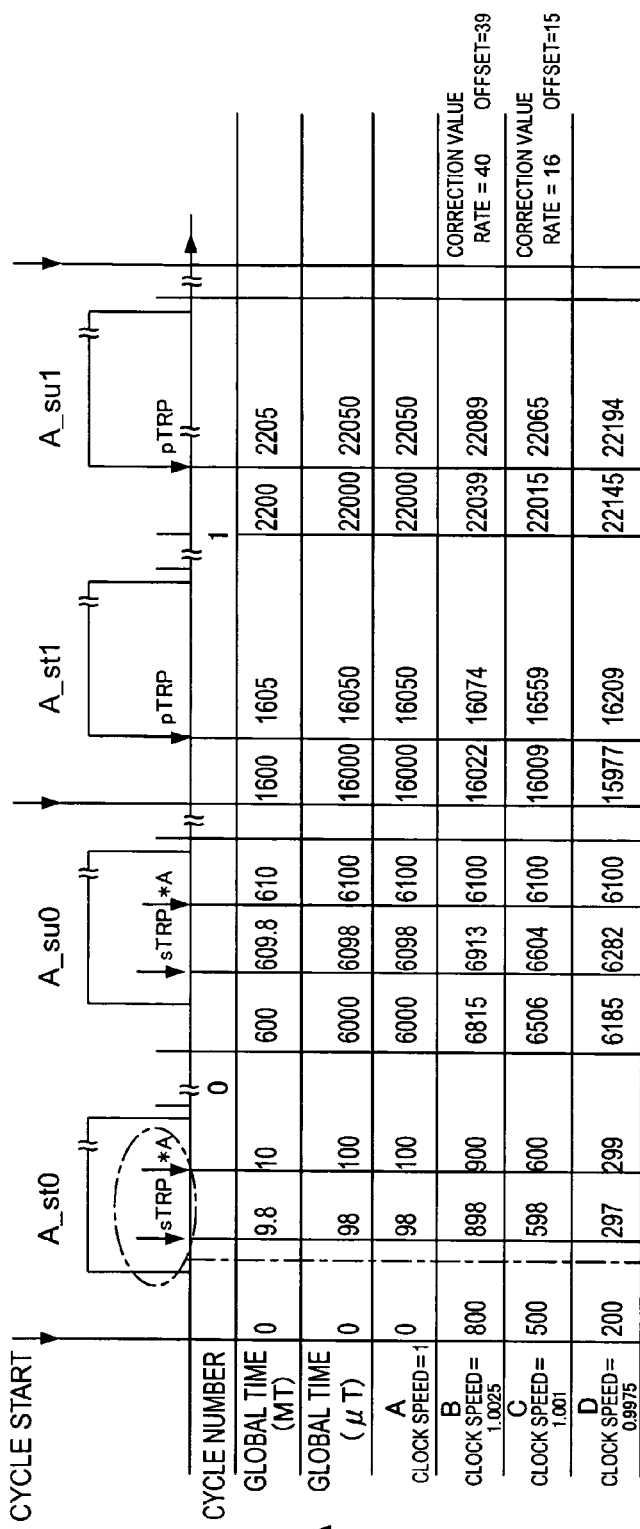
FIGS. 9A and 9B are diagrams showing the details of cycles 0 to 3 in FIG. 8.
Figure 9B:
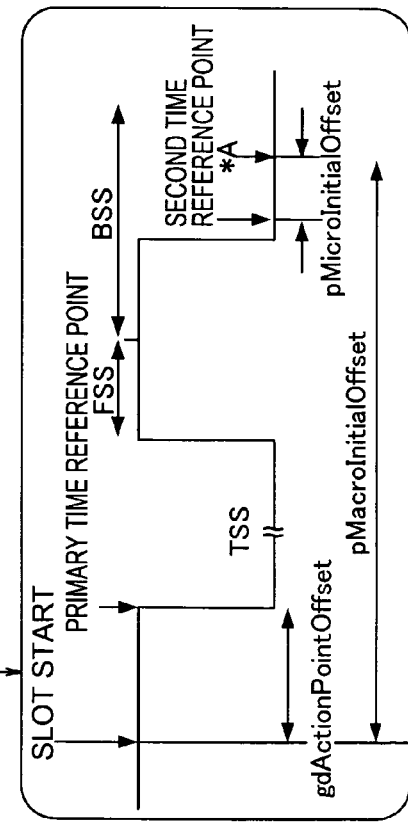

First, FIG. 8 is a timing chart showing an example of the communication cycle in the communication system according to the present invention. A case in which the terminal A becomes the leading cold start node (leading terminal) as shown in FIG. 8 will be described. FIGS. 9A and 9B show the details of the clock synchronization in the cycles 0 to 3 of FIG. 8. The respective local times of the terminals A, B, C, and D are indicated from the cycle 0. The data of the local times of the respective terminals is identical with that described above with reference to FIG. 4. The operation of the integration nodes (terminals B, C, and D) which are the integration terminals is identical with each other except for the setting values (pMacroInitialOffset, pMicroInitialOffset) inherent to the respective terminals, and therefore only the terminal B will be described below.

When the integration node (terminal B) succeeds in receiving A_st0, the integration node calculates sTRP of A_st0 in the same manner as that of the above item <Initialization of Local Time> (898 µT). The initial value of the local time is set from cycle number (0) that receives A_st0 obtained on the basis of the reception information of A_st0, a cycle length (1600 MT) which is set by the communication schedule in each of the terminals, a (static) slot length (100 MT), a slot ID (7) that is assigned to A_su0, and pMacroInitialOffset (10 MT) by the following expression:

$$L\_ini = (\text{cycle number} * \text{cycle length}) + (\text{slot ID} - 1) * \text{slot length} +$$
$$pMacroInitialOffset$$
$$= 0 * 1600 + (7 - 1) * 100 + 10$$
$$= 610 \text{ MT}$$

where cycle number is cycle No., cycle length is the length of a cycle, slot ID is a slot ID (number), slot length is the length of a slot, and pMacroInitialOffset is a p macro initial offset.

Also, the time window is set near the following time on the basis of the slot ID(1) that receives A_st0 and the above parameter.

$$Tw\_B = (\text{slot } ID - \text{slot ID}) * \text{slot length} + sTRP$$
$$= (7 - 1) * 100 + 89.8 \ w$$
$$= 689.8 \text{ MT}$$
$$= 6898 \ \mu T$$

Subsequently, the integration node initializes the local time in the same manner as that of the cycle described in the last portion of the above item <Initialization of Local Time>. When the integration node receives the sub-startup frame within the time window which is set near the above-mentioned Tw_B, the integration node starts the timer of pMicro-InitialOffset (2 µT). When the timer expires, the integration node initializes the local time by the initial value L_ini=610 MT which is set in the cycle 0, and starts the communication schedule.

Now, let us consider the above-mentioned general FlexRay and the time window that is set by the present invention. A time difference between Tw_B set in the normal FlexRay and the actual sTRP is 40 µT (16898-16838) from FIGS. 4A and 4B, and a time difference between Tw_B set in the present invention and the actual sTRP is 15 µT (6898-6913) from FIGS. 9A and 9B (in both cases, the local time of the terminal B). As described above, because the time difference between Tw_B and sTRP according to the present invention is smaller than that of the general FlexRay, when sTRP is detected as in the general FlexRay, sTRP is necessarily detected even in the present invention.

In the subsequent communication cycle (cycle 1), the following coldstart nodes (terminals B and C) conduct the initial clock adjustment by the startup frame and the sub-startup frame. In the clock adjustment, because the operation of the integration nodes (terminals B and C) is identical with each other except for the setting values (pMacroInitialOffset, pMicroInitialOffset) inherent to the respective terminals, and therefore only the terminal B will be described in more detail below.

First, the rate correction will be described. Differences of the respective reception times and reception times of the startup frame and the sub-startup frame in the cycle 1 are D_st1=16074−16050=24 µT and D_su1=22089−22050=39 µT, and a difference of 15 µT occurs during 6 slots. For that reason, a difference D_cycle per one communication cycle is represented as follows:

$$D\_cycle = cycle\ length * (D\_su1 - D\_st1) / (6 * slot\ length)$$
$$= 16000 * (39 - 24)(6 * 1000)$$
$$= 40\ \mu T$$

Thus, the same value as the adjusted value resulting from the calculation in the description of the general FlexRay is obtained. The terminal B is capable of adjusting the rate of the local time to the rate of the global time by setting the number of microticks per one communication cycle to 16040 µT. The calculated value is applied from the subsequent communication cycle (cycle 2).

Subsequently, the offset correction will be described. In the offset correction, there are used the reception time and the estimated reception time of the frame that has been received at a time close to the time at which the offset correction is implemented by two frames including the startup frame and the sub-startup frame in the cycle 1. In this embodiment, a difference D_su1 between the reception time and the estimated reception time of the sub-startup frame is used. It is presumed from D_su1 that the subsequent communication cycle startup time of the terminal B starts earlier than the communication cycle startup time of the global time by 39 µT. Under the circumstance, the time of NIT (network idle time) in the cycle 1 is lengthened by 39 µT, to thereby adjust the communication cycle start time.

Now, a time lag between the local time and the global time of the terminal B after the initial clock adjustment is studied as in the general FlexRay. As a result of applying the offset correction, the startup time T_2 of the terminal B in the cycle 2 becomes 32039 µT at the local time. When that time is replaced with the global time, T_2 is represented by the following expression:

$$T\_2 = 6100 + (32039 - 6100) / 1.0025$$
$$= 31974.31 \rightarrow 31974\ \mu T$$

It is found that a difference of 26 µT remains as compared with the startup time in the cycle 2 at the global time. On the other hand, as a result of applying the rate correction, the rate of the local time at the terminal B is equal to the rate of the global time. For that reason, the relationship between the local time and the global time of the terminal B in the cycle 2 and the following cycles is represented by the following expression:

$$local\ time = global\ time + 26$$

For that reason, the error in the local time of the terminal B with respect to the global time in the present invention becomes smaller. From that fact, it is found that when the error in the local time of the general FlexRay is within a permissible range, the clock synchronization can be established by the initial clock synchronization of the present invention.

The clock adjustment in the cycle 2 and the subsequent cycles is identical with that of the general FlexRay technique in the cycle 4 and the subsequent cycles, and therefore its description will be omitted.

As a result, in a communication system in which a plurality of terminals 2 are connected to each other through a transmission path 1 so as to establish a network, each of the terminals includes a transmitting section 22 that transmits a frame, a receiving section 23 that receives the frame, clock means 24 for generating a local time inherent to the terminal, clock synchronizing means 25 for calculating a reception time of the frame, an estimated reception time of the frame, and an initial value of the local time, and adjusting a clock, storing means 26 for storing a communication schedule that defines a transmission and reception procedure of the frame within a communication cycle of a given period and setting information related to the communication schedule, and communication control means 21 for controlling the communication operation of the terminal by the transmitting section and the receiving section on the basis of the local time and the communication schedule. The communication control means 21 in each of the terminals operates as a leading terminal that leads the communication schedule in a case where the terminal first starts the communication among the plurality of terminals, and operates as an integration terminal that conducts the integration into the network in other cases in a startup phase where the network is established. In the case where the terminal is the leading terminal, the terminal transmits the sub-startup frame in the same communication cycle at a timing where the estimated reception time can be calculated with the startup frame for the global time reference and the communication schedule that is stored in the integration terminal at a transmission timing that is defined by the communication schedule in advance, after starting the communication schedule with the local time as the global time used on the network. On the other hand, in the case where the terminal is the integration terminal, the terminal receives the startup frame and the sub-startup frame, and starts the communication schedule by the local time according to an initial value of the local time calculated from the reception time of the startup frame, the reception time of the sub-startup frame, and the estimated reception time. The clock synchronizing means 25 calculates the initial value of the local time according to the reception time of the startup frame, the reception time and the estimated reception time of the sub-startup frame. The present invention described in this embodiment is applied, thereby making it possible to reduce the initialization of the local time that requires two cycles in the general FlexRay to one cycle.

Also, a communication system in which a plurality of terminals 2 are connected to each other through a transmission path 1 so as to establish a network, is characterized in that each of the terminals includes a transmitting section 22 that transmits a frame, a receiving section 23 that receives the frame, clock means 24 for generating a local time inherent to the terminal, clock synchronizing means 25 for calculating a reception time of the frame, an estimated reception time of the frame, and an initial value of the local time, and adjusting a clock, storing means 26 for storing a communication schedule that defines a transmission and reception procedure of the frame within a communication cycle of a given period and setting information related to the communication schedule, and communication control means 21 for controlling the communication operation of the terminal by the transmitting section and the receiving section on the basis of the local time and the communication schedule. The communication control means 21 in each of the terminals operates as a leading terminal that leads the communication schedule in a case where the terminal first starts the communication among the plurality of terminals, and operates as an integration terminal that conducts the integration into the network in other cases in a startup phase where the network is established. In the case where the terminal is the leading terminal, the terminal transmits the sub-startup frame in the same communication cycle at a timing that can calculate the estimated reception time due to the startup frame for the global time reference and the communication schedule that is stored in the integration terminal at a transmission timing that is defined by the communication schedule in advance, after starting the communication schedule with the local time as the global time used on the network. On the other hand, in the case where the terminal is the integration terminal, the terminal starts the communication schedule by the local time, and the clock synchronizing means 25 receives the startup frame and the sub-startup frame, and conducts the clock adjustment of the local time and the global time from the respective reception times and the estimated reception time. The above structure makes it possible to reduce the initialization of the local time that requires two cycles in the general FlexRay to one cycle. In the clock adjustment subsequent to the cycle 2, because the same processing as that in the general FlexRay is used, a required period of time is not changed. Accordingly, a period of time required for shifting from the startup phase to the communication phase becomes 4 cycles are required in the leading coldstart node (leading terminal), 5 cycles in the following coldstart node (integration terminal), and 6 cycles in the non-coldstart node (integration terminal). It is found that, as compared with the general FlexRay, a period of time required for the integration into the network can be reduced in both the cases.

Figure 10:
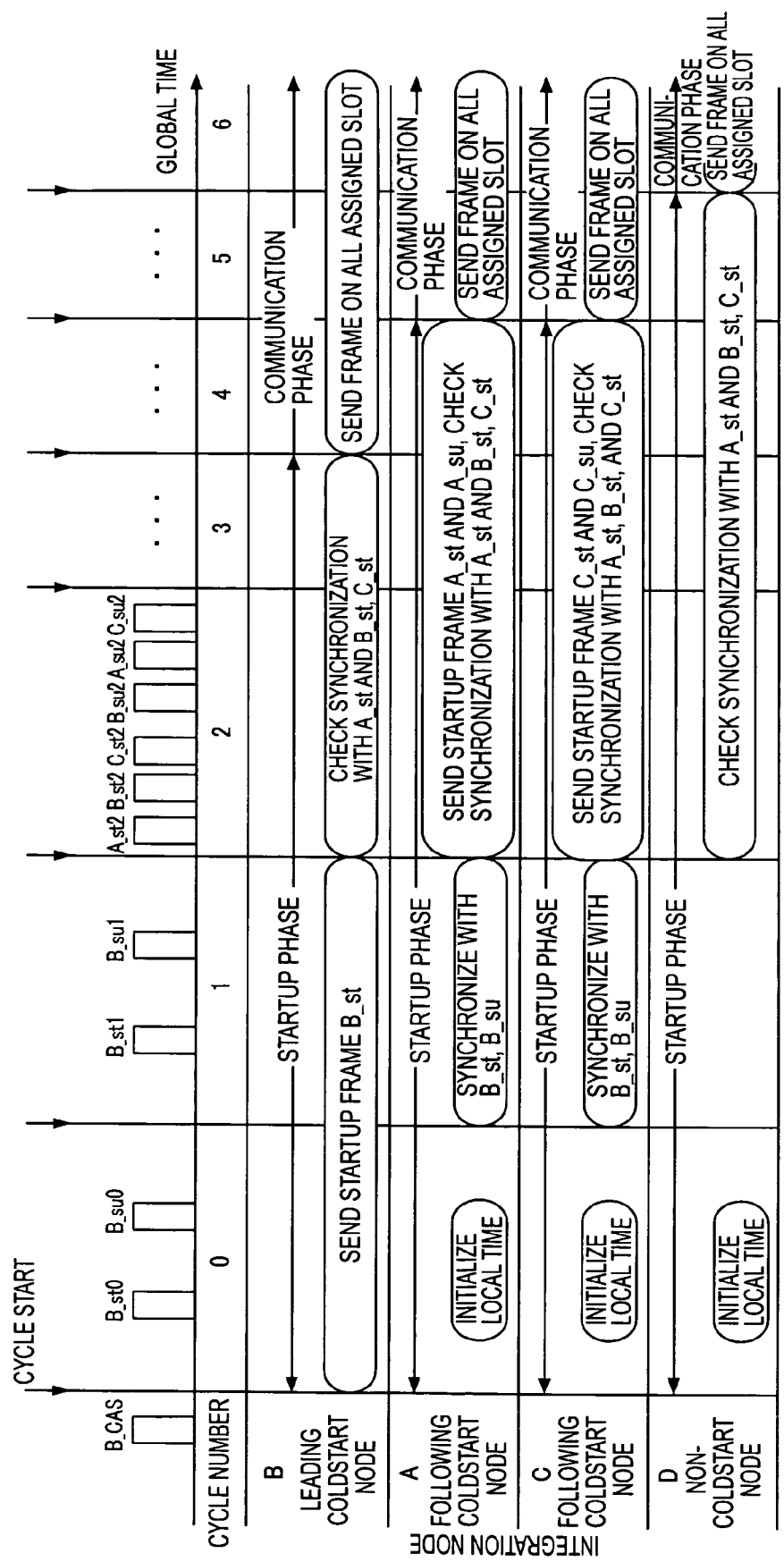
FIG. 10 is a timing chart showing another example of the communication cycle in the communication system according to the first embodiment of the present invention.
Figure 11:
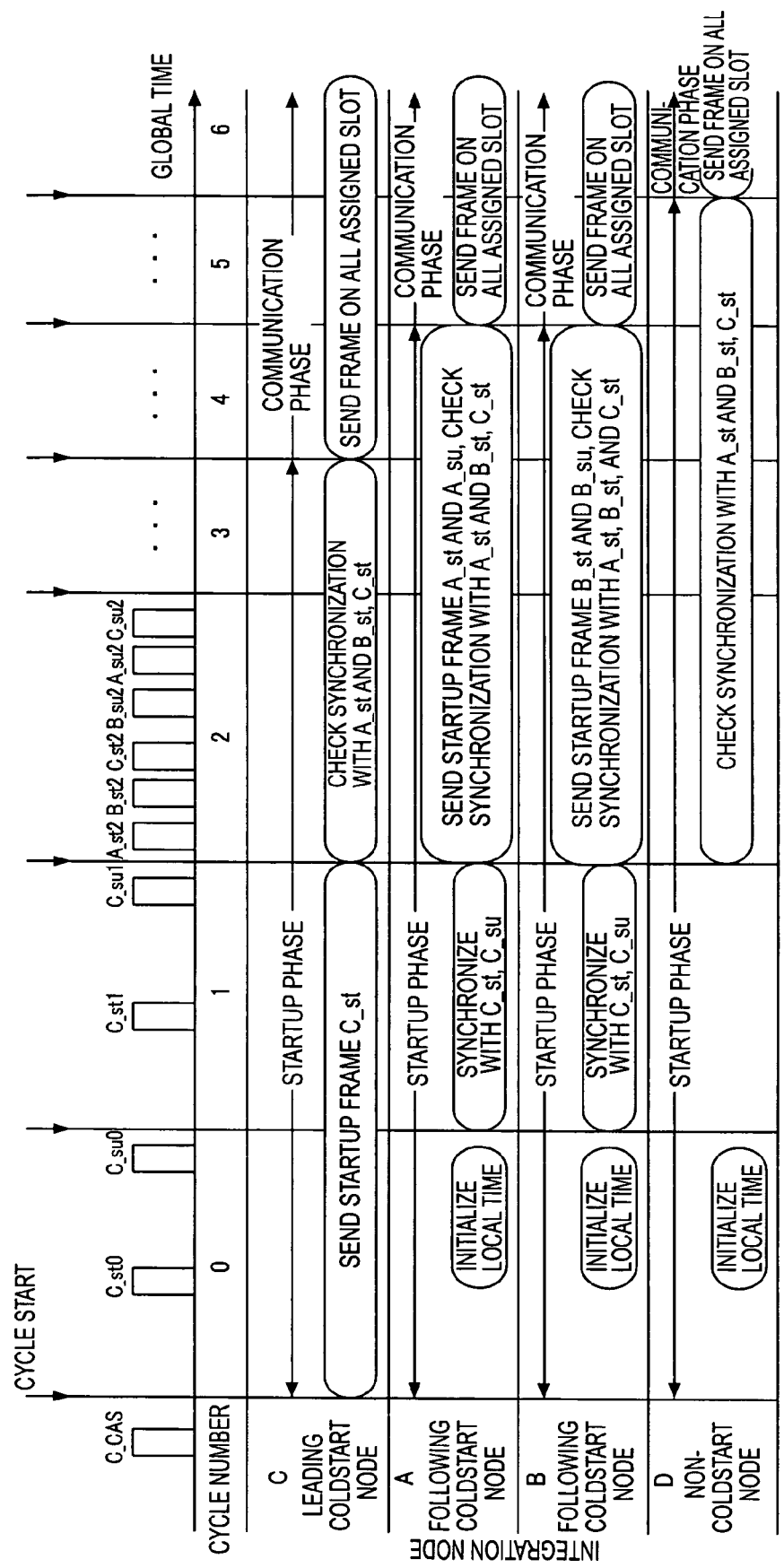
FIG. 11 is a timing chart showing another example of the communication cycle in the communication system according to the first embodiment of the present invention.

FIG. 10 is a timing chart when the terminal B shifts from the startup phase to the communication phase in the case where the terminal B becomes a leading coldstart node, and FIG. 11 is a timing chart when the terminal C shifts from the startup phase to the communication phase in the case where the terminal C becomes a leading coldstart node. In both of those cases, the initialization of the local time and the initial clock adjustment are conducted in the same manner as that in the case where the terminal A is the leading coldstart node, and therefore their description will be omitted.

Second Embodiment

In the first embodiment, the sub-startup frame is assigned to the static segment to reduce a period of time required for the integration into the network. Because the frame format of the sub-startup frame is identical with the normal frame, application data is transmitted in the time slot that is assigned to the sub-startup frame, thereby making it possible to effectively use the sub-startup frame even after shifting to the communication phase.

In a second embodiment, when the sub-startup frame is transmitted in the static segment, the time slot during which the sub-startup frame is transmitted is assigned to the communication schedule. As a result, because the time slot to which a frame other than the startup frame and the sub-startup frame is assigned is reduced, the degree of freedom of a design of the communication schedule is damaged. In addition, in the cycle 2 and the subsequent cycles, though the sub-startup frame that is transmitted from the terminal other than the leading coldstart node is not used in the integration into the network, the time slot is assigned to the sub-startup frame in the communication schedule. As a result, even in the case where it is not always necessary to transmit the frame in the assigned time slot, the transmission right of the frame is given.

Figure 12:
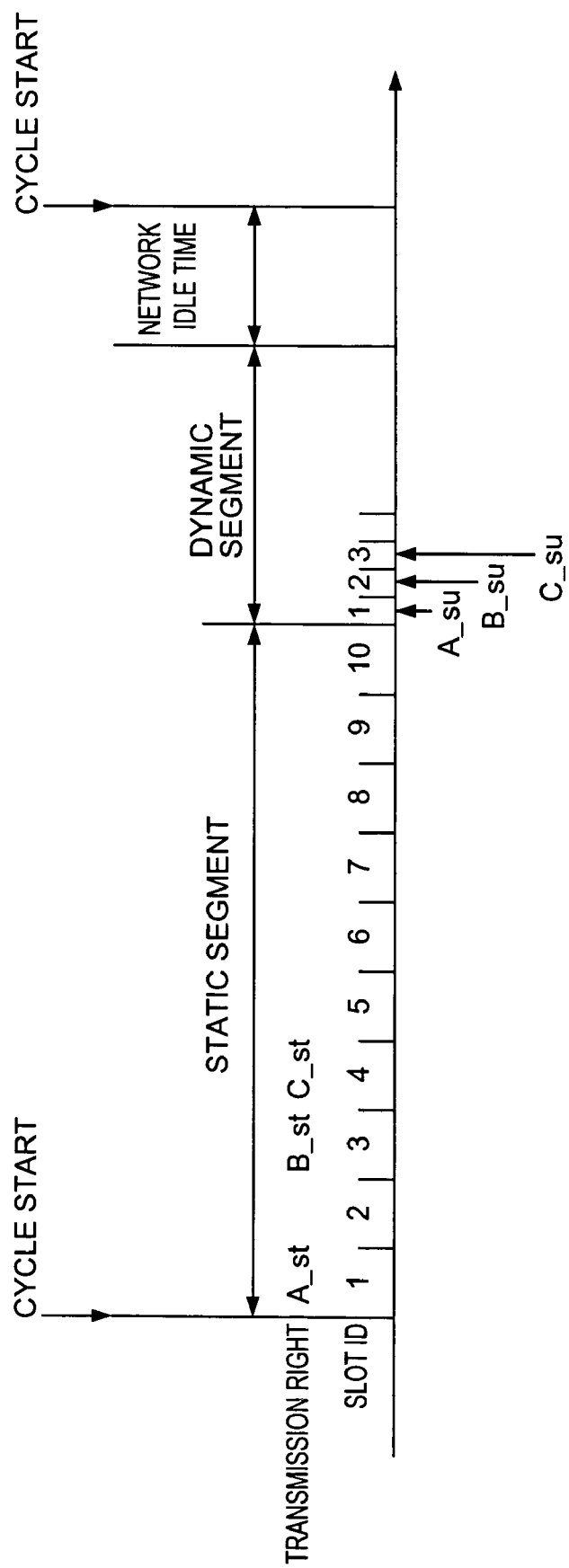
FIG. 12 is a diagram showing another example of the communication schedule in one cycle of the communication system according to the present invention.

In order to solve the above state, in this embodiment, the sub-startup frame is transmitted in the dynamic segment which is a communication portion of the event type. FIG. 12 shows an example of the communication schedule in one cycle of the communication pattern in that case.

As shown in FIG. 12, the sub-startup frame is assigned from minislot ID=1 in the dynamic segment in turn. In this situation, the minislots are assigned to the terminals in the order higher in the possibility that the terminal becomes the leading coldstart node as 1, 2, 3, . . . In this embodiment, minislot ID=1 is assigned to the terminal A, minislot ID=2 is assigned to the terminal B, and minislot ID=3 is assigned to the terminal C. Those settings are defined by the communication schedule so that all of the terminals which can be connected to the network receive all of the sub-startup frames.

Figure 14A:
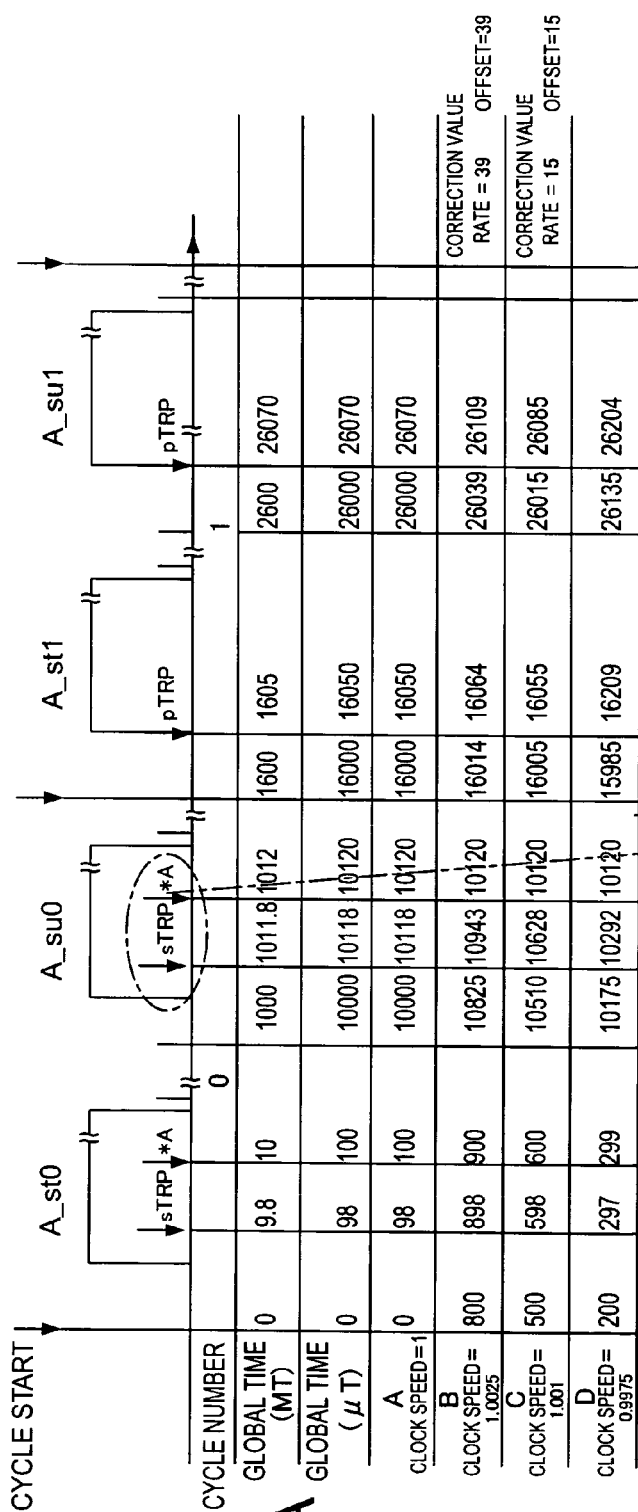
FIGS. 14A and 14B are diagrams showing the details of cycles 0 to 1 in FIG. 13.
Figure 14B:
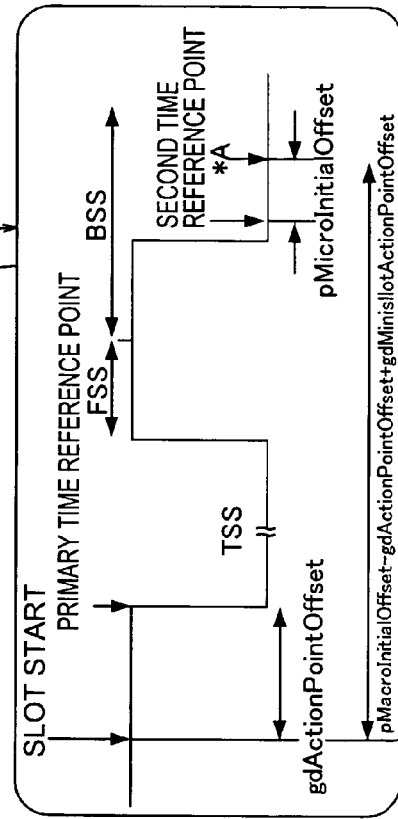

First, a case in which the terminal A becomes the leading coldstart node as shown in FIG. 13 will be described. FIGS. 14A and 14B show the details of the clock synchronization in the cycles 0 and 1, and the respective local times of the terminals A, B, C, and D are indicated from the cycle 0. The data of the local times of the respective terminals is identical with that described with reference to FIG. 4 in advance. The operation of the integration nodes (terminals B, C, and D) is identical with each other except for the setting values (pMacroInitialOffset, pMicroInitialOffset) inherent to the respective terminals, and therefore only the terminal B will be described in more detail below.

After the terminal A starts the communication schedule by the local time, the terminal A transmits A_st0 and A_su0 in the static segment and the dynamic segment, respectively. When the integration node (terminal B) succeeds in receiving A_st0, the integration node calculates the time of sTRP of A_st1 in the same manner as that of the above item <Initialization of Local Time> (898 μT). The initial value of the local time is set according to the startup time Td (1000 MT) in the dynamic segment which is set by the communication schedule in the respective terminals, gdActionPointOffset (5), gdMiniSlotActionPointOffset (7), and pMacroInitialOffset

(10) (refer to FIGS. 2A and 2B, gdActionPointOffset (5) is a static action point offset, gd MiniSlotActionPointOffset (7) corresponds to the minislot action point offset, and pMacroInitialOffset (10) is supposed in advance as described above) by the following expression.

$$L\_ini = (\text{cycle number} * \text{cycle length}) + Td +$$
$$\left( \begin{array}{c} pMacroInitialOffset - gdActionPointOffset + \\ gdMinislotActionPointOffset \end{array} \right)$$
$$= 0 * 16000 + 10000 + (100 - 50 + 70)$$
$$= 10120 \; \mu T$$

Also, the time window is set near the following time on the basis of the slot ID that receives A_su0 and the above parameter.

$$Tw = Td + (gdMinislotActionPointOffset - gdActionPointOffset) + sTRP$$
$$= 1000 + (7 - 5) + 89.8$$
$$= 1091.8 \; MT$$
$$= 10918 \; \mu T$$

Subsequently, the integration node initializes the local time in the same manner as that of the cycle described in the last portion of the above item <Initialization of Local Time>. When the integration node receives the sub-startup frame within the time window which is set as described above in this embodiment, the integration node starts the timer of pMicroInitialOffset (2 µT). When the timer expires, the integration node initializes the local time by the initial value L_ini=10120 µT which is set in the cycle 0, and starts the communication schedule.

Now, let us consider the general FlexRay and the time window that is set by the present invention. A time difference between Tw_B set in the normal FlexRay and the actual sTRP is 40 µT from FIGS. 4A and 4B, and a time difference between Tw_B set in this embodiment and the actual sTRP is 25 µT from FIGS. 14A and 14B (in both cases, the local time of the terminal B). As described above, because the time difference between Tw_B and sTRP is smaller than that of the general FlexRay, when sTRP is detected as in the general FlexRay, sTRP is necessarily detected even in the present invention.

In the subsequent communication cycle (cycle 1), the following coldstart nodes (terminals B, C, and D) conduct the initial clock adjustment by the startup frame and the sub-startup frame. In the clock adjustment, because the operation of the integration nodes (terminals B, C, and D) is identical with each other except for the setting values (pMacroInitialOffset, pMicroInitialOffset) inherent to the respective terminals, and therefore only the terminal B will be described in more detail below.

First, the rate correction will be described. Differences of the respective reception times and reception times of the startup frame and the sub-startup frame in the cycle 1 are D_st1=16064−16050=14 µT and D_su1=26109−26070=39 µT, and a difference of 25 µT occurs between pTRP of A_st1 and pTRP of A_su1. T_st_su which is a period of time from A_st1 to A_su1 of pTRP is represented by the following expression:

$$T\_st\_su = Td + \left( \begin{array}{c} gdMinislotActionPointOffset - \\ gdActionPointOffset \end{array} \right)$$
$$= 10000 + (70 - 50)$$
$$= 10020 \; \mu T$$

For that reason, a difference D_cycle per one communication cycle is represented as follows:

$$D\_cycle = \text{cycle length} * (D\_su2 - D\_su1) / T\_st\_su$$
$$= 16000 * (39 - 14) / (10020)$$
$$= 39.92 \rightarrow 39 \; \mu T$$

Thus, a value which is different from the adjusted value resulting from the calculation in the description of the general FlexRay is obtained. The terminal B is capable of adjusting the rate of the local time by setting the number of microticks per one communication cycle to 16039 µT. The calculated value is applied from the subsequent communication cycle (cycle 2).

Subsequently, the offset correction will be described. In the offset correction, there are used the reception time and the estimated reception time of the frame that has been received at a time close to the time at which the offset correction is implemented by two frames including the startup frame and the sub-startup frame in the cycle 1. In this embodiment, a difference D_su1 between the reception time and the estimated reception time of the sub-startup frame is used. It is presumed from D_su1 that the subsequent communication cycle startup time of the terminal B starts earlier than the communication cycle startup time of the global time by 39 µT. Under the circumstance, the time of NIT (network idle time) in the cycle 1 is lengthened by 39 µT, to thereby adjust the communication cycle start time.

Now, a time lag between the local time and the global time of the terminal B after the initial clock adjustment is studied as in the general FlexRay. As a result of applying the offset correction, the startup time T_2 of the terminal B in the cycle 2 becomes 32039 µT at the local time. When that time is replaced with the global time, T_2 is represented by the following expression:

$$T\_2 = 6100 + (32039 - 6100) / 1.0025$$
$$= 31974.31 \rightarrow 31974 \; \mu T$$

It is found that a difference of 26 µT remains as compared with the startup time in the cycle 2 at the global time. On the other hand, as a result of applying the rate correction, the rate of the local time at the terminal B is not equal to the rate of the global time. However, the maximum error between the global time and the local time which occurs in a period of time of the two communication cycles after the initial clock adjustment has been implemented is 41 µT from the above expression in the case of the general FlexRay. On the contrary, in this example, the maximum error is 64000−T_2−2*16000*(16039/16040)=about 28 µT. For that reason, the error in the local time of the terminal B with respect to the global time in the present invention becomes smaller. From that fact, it is found that when the error in the local time of the general FlexRay is within a permissible range, the clock synchronization can be established by the initial clock synchronization of the present invention.

In the cycle 2 and the subsequent cycles, as shown in FIG. 13, the following coldstart nodes (terminals B and C) conduct the subsequent clock adjustment without transmitting the sub-startup frame. The clock adjusting method is identical with that of the general FlexRay technique in the cycle 4 and the subsequent cycles, and therefore its description will be omitted.

Figure 16:
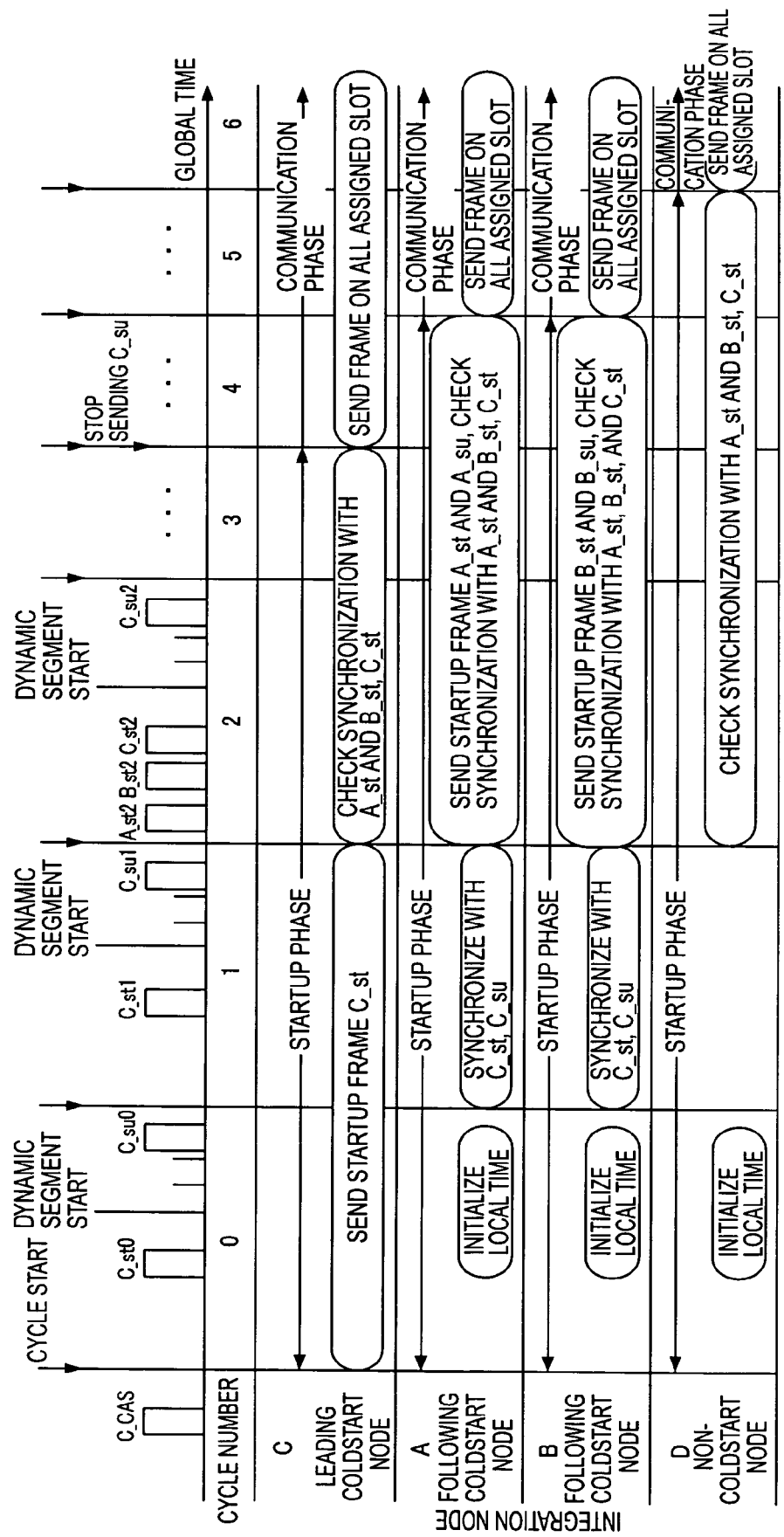
FIG. 16 is a timing chart showing another example of the communication cycle in the communication system according to the second embodiment of the present invention.

FIG. 15 is a timing chart when the terminal B shifts from the startup phase to the communication phase in the case where the terminal B becomes a leading coldstart node, and FIG. 16 is a timing chart when the terminal C shifts from the startup phase to the communication phase in the case where the terminal C becomes a leading coldstart node. In both of those cases, the procedure is identical with that in the case where the terminal A becomes the leading coldstart node. Taking an influence of a free minislot until the sub-startup frame is transmitted since the dynamic segment starts into consideration, L_ini and Tw are represented as follows:

$L\_ini$=(cycle number*cycle length)+$Td$+minislot length*(minislot $ID$−1)+($p$MacroInitialOffset−$gd$ActionPointOffset+$gd$MinislotActionPointOffset)

$Tw=Td$+minislot length*(minislot $ID$−1)+($gd$MinislotActionPointOffset−$gd$ActionPointOffset)+$sTRP$ Other procedure is identical with that in the case where the terminal A is the leading coldstart node, and therefore its description will be omitted.

The leading coldstart node suspends the transmission of the sub-startup frame because the transmission command of the sub-startup frame from the communication control means 21 has been completed when its own terminal shifts to the communication phase.

As described above, the communication system according to this embodiment is characterized in that, in the case of the leading terminal, the communication control means 21 defines the sub-startup frame to the communication portion of the event type in the case where the communication portion of the event type which transmits the frame is disposed within the communication schedule, and instructs the transmission of the sub-startup frame in the case where the communication portion of the event type is within the initial section of the communication schedule. With the above configuration, a period of time required for the integration into the network can be reduced, and the transmission efficiency can be improved because only the terminal which becomes the leading coldstart node (leading terminal) transmits the sub-startup frame only in the startup phase.

Third Embodiment

Figure 17:
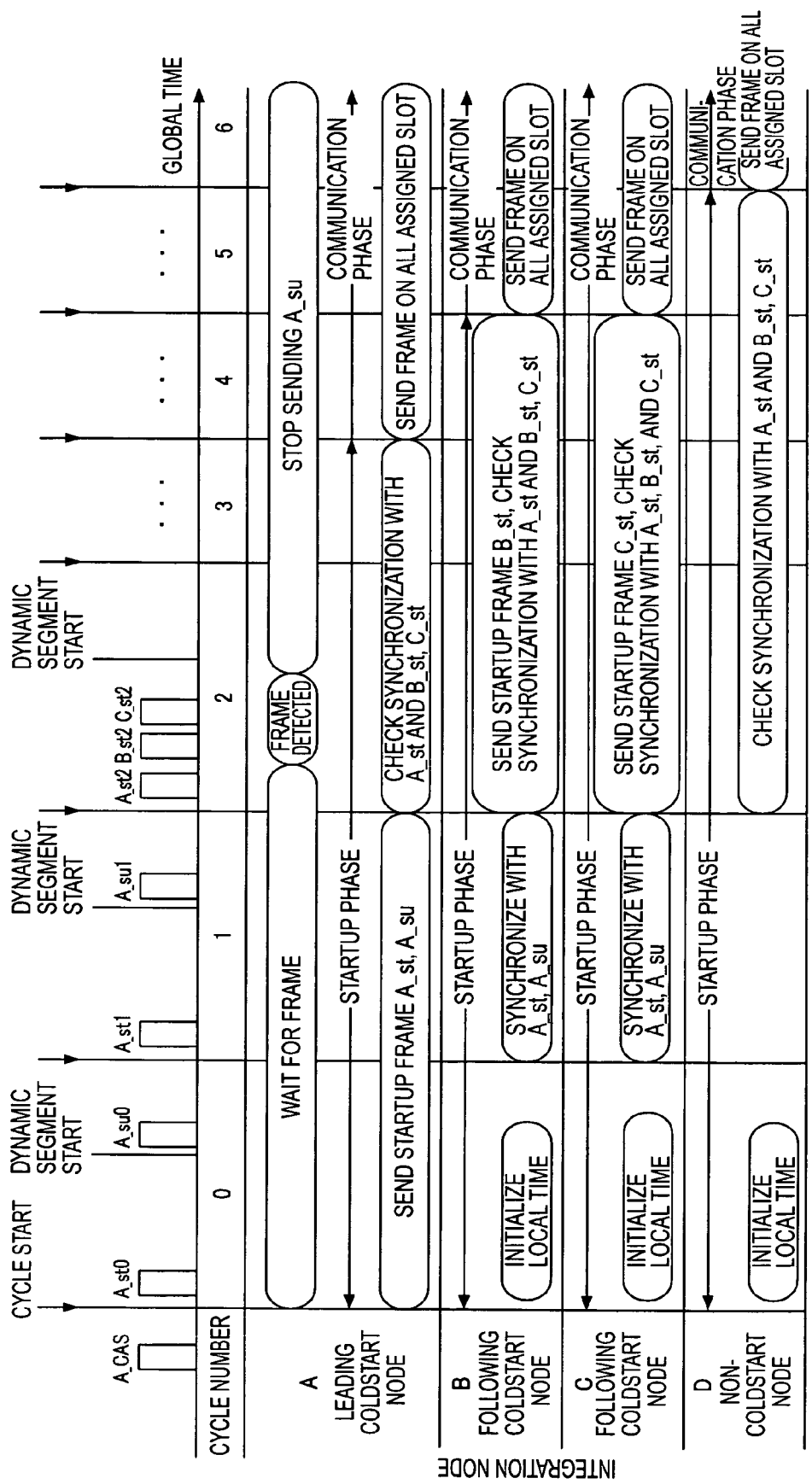
FIG. 17 is a timing chart showing an example of the communication cycle of the communication system according to a third embodiment of the present invention.

As shown in a timing chart of FIG. 17, a communication system according to this embodiment can be realized by completing the transmission command of the sub-startup frame when the communication control means 21 of the leading coldstart node (terminal A) observes the transmission path 1, and detects a frame that is transmitted from another terminal.

As described above, the communication system is characterized in that the communication control means 21 completes the transmission command of the sub-startup frame in the case where the transmission of the frame starts from the integration terminal after the transmission of the auxiliary start frame starts. As a result, the sub-startup frame is transmitted only while the sub-startup frame is used in the integration node, thereby making it possible to improve the use efficiency of the transmission path.

Fourth Embodiment

Figure 18:
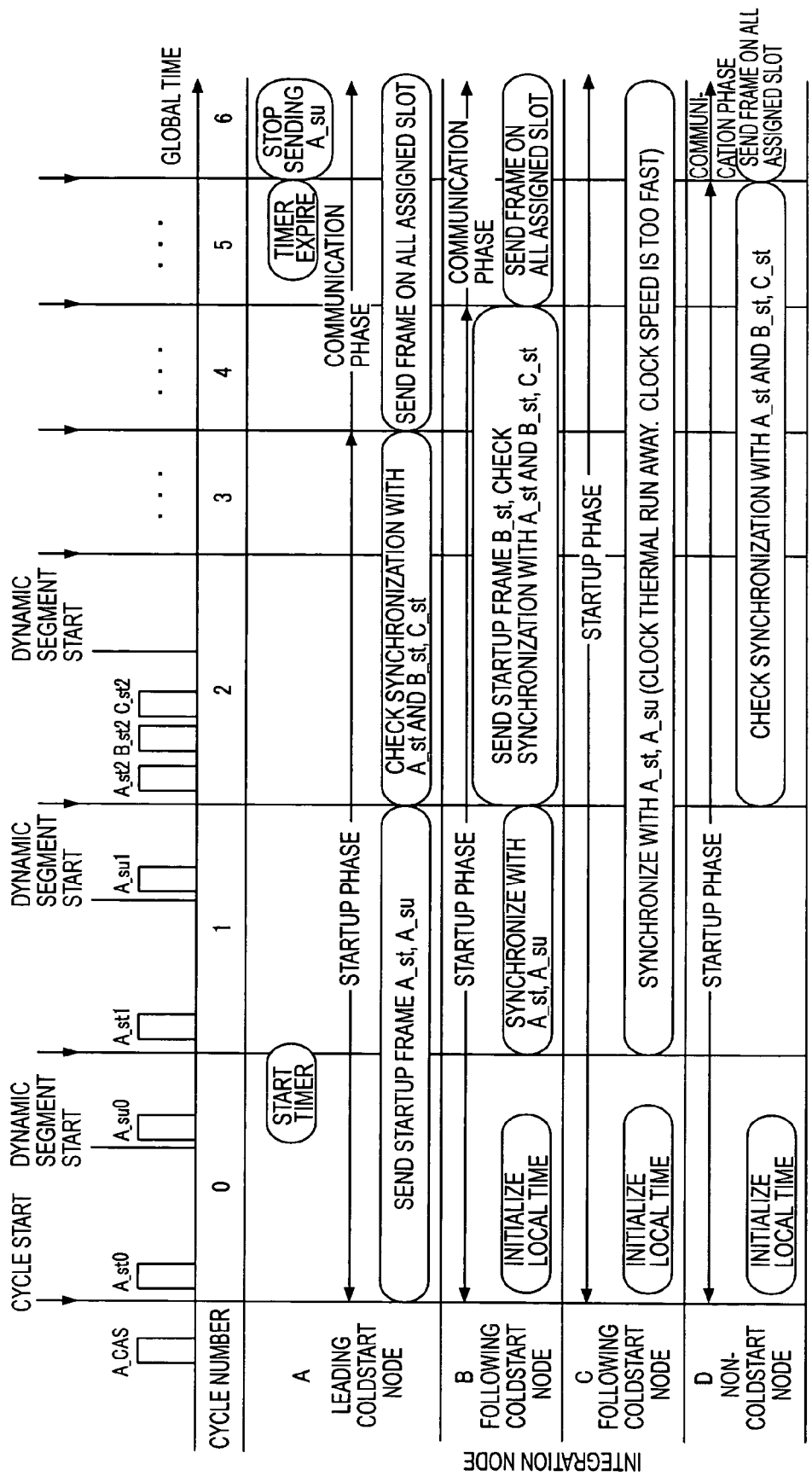
FIG. 18 is a timing chart showing an example of the communication cycle of the communication system according to a fourth embodiment of the present invention.

A communication system according to this embodiment can be realized when the communication control means 21 starts a timer after the transmission of the sub-startup frame starts, and completes the transmission command of the sub-startup frame when the timer expires, as shown in a timing chart of FIG. 18.

As described above, the communication system is characterized in that the communication control means 21 completes the transmission command of the sub-startup frame a given period of time after starting to transmit the sub-startup frame. As a result, in the case where the integration node cannot achieve the initialization of the clock due to a trouble such as thermorunaway of the clock, it is possible to avoid a state in which the leading coldstart node continuously transmits the sub-startup frame.

Fifth Embodiment

A communication system according to this embodiment transmits an auxiliary startup frame in a static segment.

Figure 19:
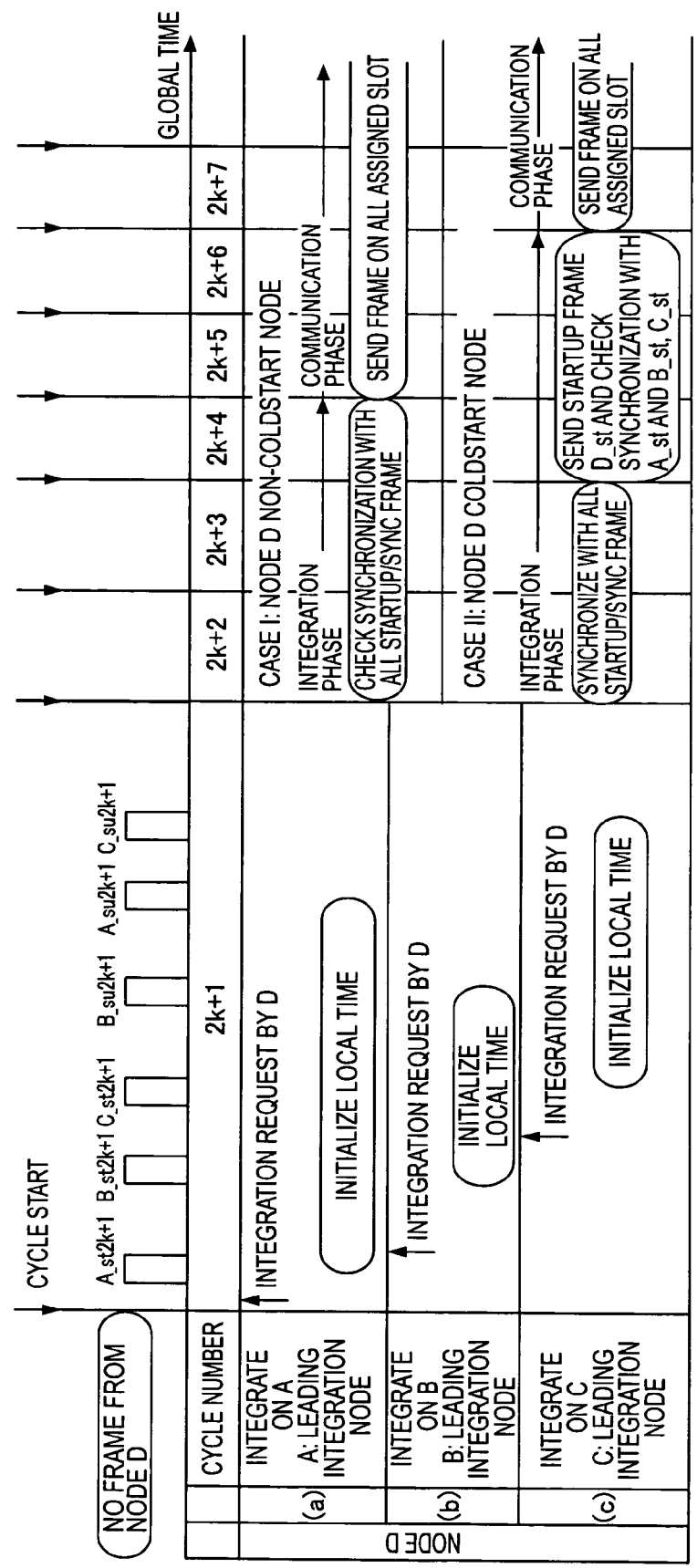
FIG. 19 is a timing chart showing an example of the communication cycle of the communication system according to a fifth embodiment of the present invention.
Figure 20:
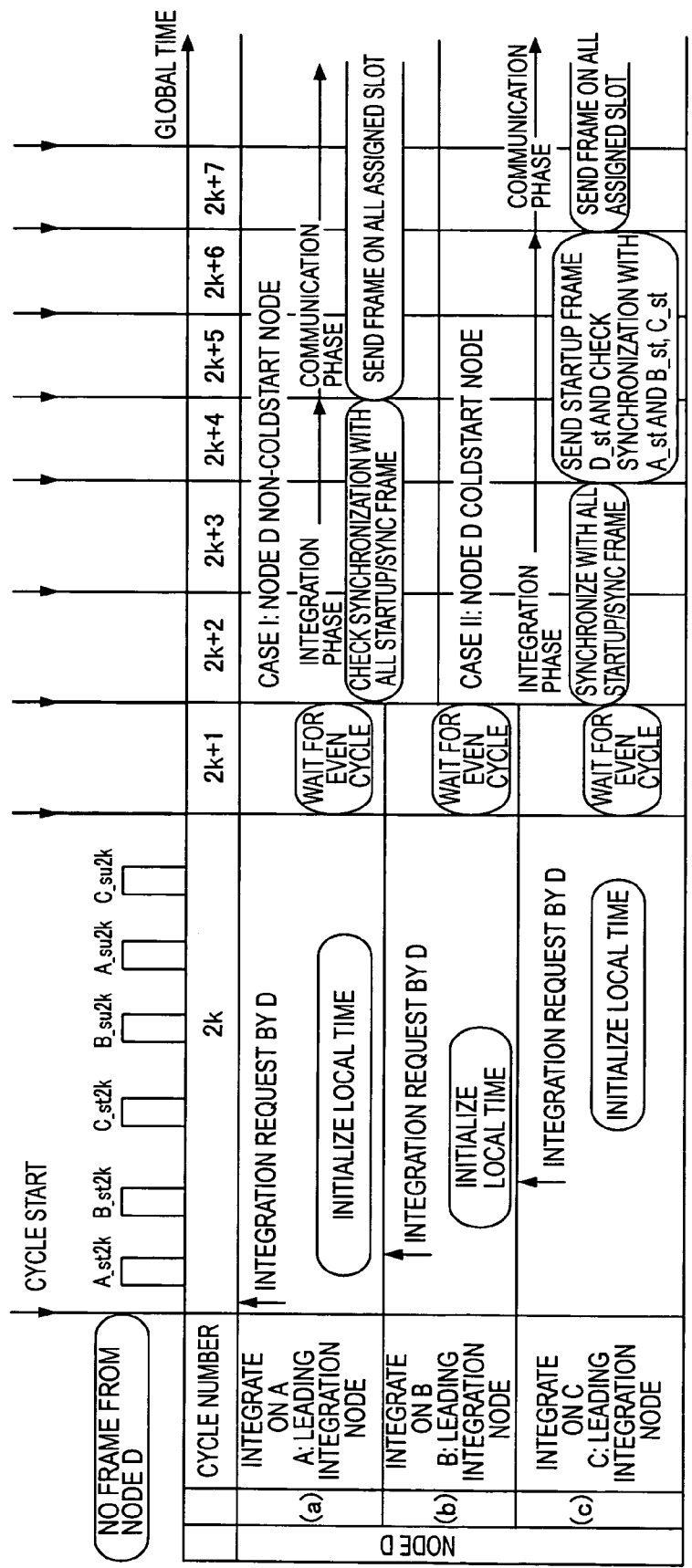
FIG. 20 is a timing chart showing another example of the communication cycle of the communication system according to the fifth embodiment of the present invention.

FIGS. 19 and 20 are timing charts in the case where the terminal D conducts, as an integration node, the clock synchronization with the network where the terminals A, B, and C start to transmit the frames in the communication schedule of FIG. 7. The integration node (terminal D) conducts the clock synchronization with one arbitrary terminal (leading integration node) among a plurality of terminals that have already established the clock synchronization as in the above-mentioned general FlexRay.

FIG. 19A shows a case in which the integration node (terminal D) has first received the startup frame that has been transmitted from the terminal A in an odd communication cycle $2k+1$ (the terminal A is the leading coldstart node). In this case, the terminal D initializes the local time according to a startup frame A_st$2k+1$ and a sub-startup frame A_su$2k+1$ which are transmitted from the terminal A. The initial value calculating method of the local time is identical with the initialization of the local time in the startup phase (described in the first embodiment), and therefore its description will be omitted.

The (b) and (c) in FIG. 19 show cases in which the terminal B and the terminal C are the leading integration nodes in the odd communication cycle $2k+1$, respectively. The respective operation is identical with that in the case of (a) in FIG. 19, and therefore its description will be omitted.

When the integration node has completely initialized the local time, the clock is adjusted in the same manner as that of the above general FlexRay in the subsequent communication cycle (even communication cycle) or later. The detailed description of the clock adjustment will be omitted.

On the other hand, (a) in FIG. 20 shows a case in which the integration node (terminal D) has first received the startup frame that has been transmitted from the terminal A in an even communication cycle $2k$ (the terminal A is the leading coldstart node). In this case, the terminal D initializes the local time according to a startup frame A_st$2k$ and a sub-startup frame A_su$2k$ which are transmitted from the terminal A. The initial value calculating method of the local time is identical with the initialization of the local time in the startup phase (described in the first embodiment), and therefore its description will be omitted.

The (b) and (c) in FIG. 20 show cases in which the terminal B and the terminal C are the leading integration nodes in the even communication cycle $2k$, respectively. The respective operation is identical with that in the case of (a) in FIG. 20, and therefore its description will be omitted.

When the integration node has completely initialized the local time, the clock is adjusted in the same manner as that of the above general FlexRay. However, because the processing related to clock synchronization starts in the even communication cycle in the general FlexRay as described above, the integration node is in a standby state without conducting the clock adjustment in the subsequent odd communication cycle ($2k+1$) or later. Then, in the subsequent event communication cycle ($2k+2$) or later, the clock adjustment is conducted in the same manner as that described above. The detailed description of the clock adjustment will be omitted.

As described above, a communication system according to this embodiment in which a plurality of terminals 2 are connected to each other through a transmission path 1 so as to establish a network, is characterized in that each of the terminals 2 includes a transmitting section 22 that transmits a frame, a receiving section 23 that receives the frame, clock means 24 for generating a local time inherent to the terminal, clock synchronizing means 25 for calculating a reception time of the frame, an estimated reception time of the frame, and an initial value of the local time, and adjusting a clock, storing means 26 for storing a communication schedule that defines a transmission and reception procedure of the frame within a communication cycle of a given period and setting information related to the communication schedule, and communication control means 21 for controlling the communication operation of the terminal by the transmitting section and the receiving section on the basis of the local time and the communication schedule. The communication control means 21 in each of the terminals obtains a member list indicative of all of the terminals which can be connected to the network from the communication schedule. In the case where parts of the terminals listed in the member list do not transmit the frame, at least one of the terminals that have already transmitted the frames functions as the leading integration terminal that leads the integration into the network, and the terminals that do not start to transmit the frames function as the integration terminals. In the case where the terminal is the leading integration terminal, the terminal transmits the startup frame at a transmission timing that is defined by the communication schedule in advance, and the sub-startup frame at a timing that allows the estimated reception time to be calculated by the communication schedule which is stored by the integration terminal in the same communication cycle, respectively. On the other hand, in the case where the terminal is the integration terminal, the terminal receives a pair of startup frame and auxiliary startup frame from the startup frames and the sub-startup frames which are transmitted from the plural terminals, and starts the communication schedule by the local time according to an initial value of the local time which are calculated according to the reception time of the startup frame, the reception time and the estimated reception time of the sub-startup frame. The clock synchronizing means 25 calculates the initial value of the local time according to the reception time of the startup frame, the reception time and the estimated reception time of the sub-startup frame. In the communication system, the period of time required for initializing the local time by the integration node (integration terminal) in the integration phase is equal (two cycles) to or shorter (one cycle) than that in the case where the local time is initialized in the general FlexRay. As a result, it is found that the period of time required for the integration into the network can be reduced.

Sixth Embodiment

It is shown below that a communication system according to this embodiment transmits a sub-startup frame in a dynamic segment.

Figure 21:
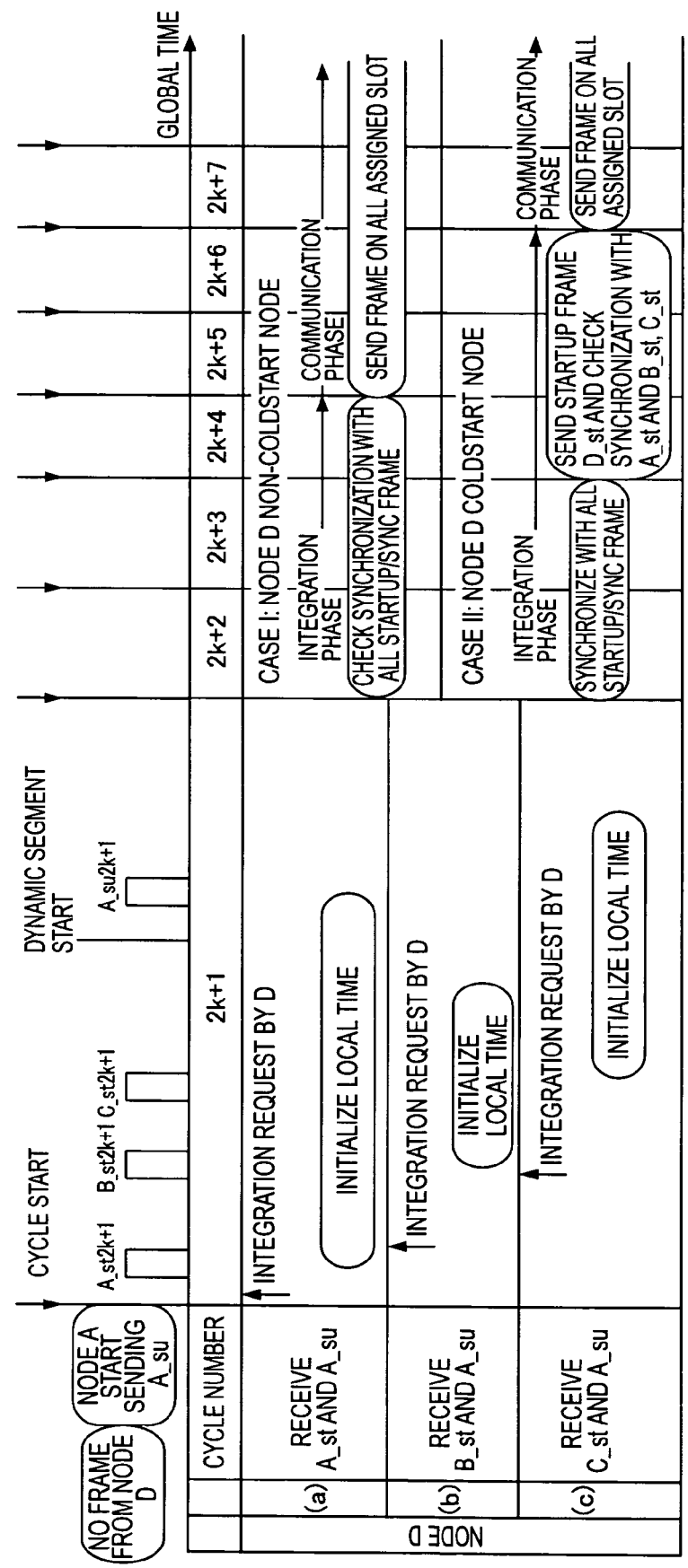
FIG. 21 is a timing chart showing an example of the communication cycle of the communication system according to a sixth embodiment of the present invention.
Figure 22:
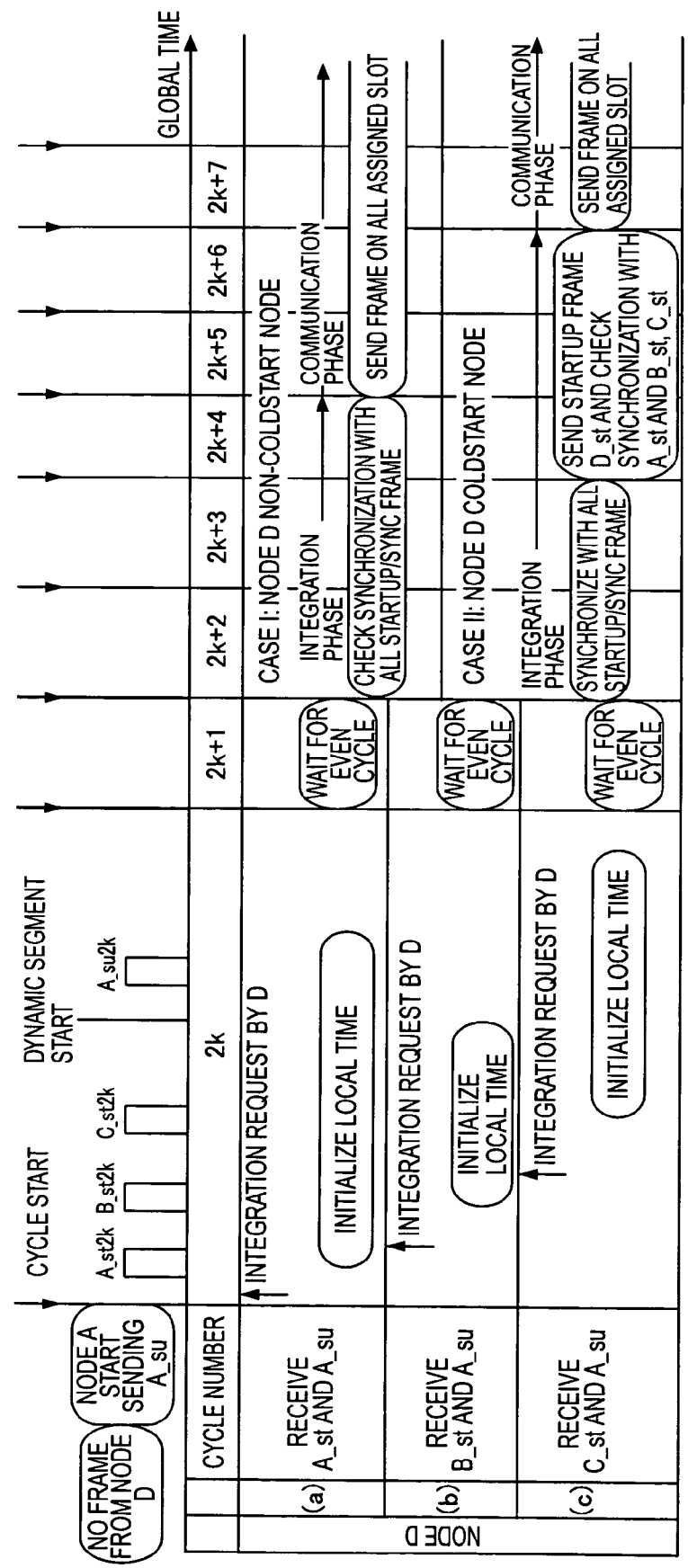
FIG. 22 is a timing chart showing another example of the communication cycle of the communication system according to the sixth embodiment of the present invention.
Figure 23:
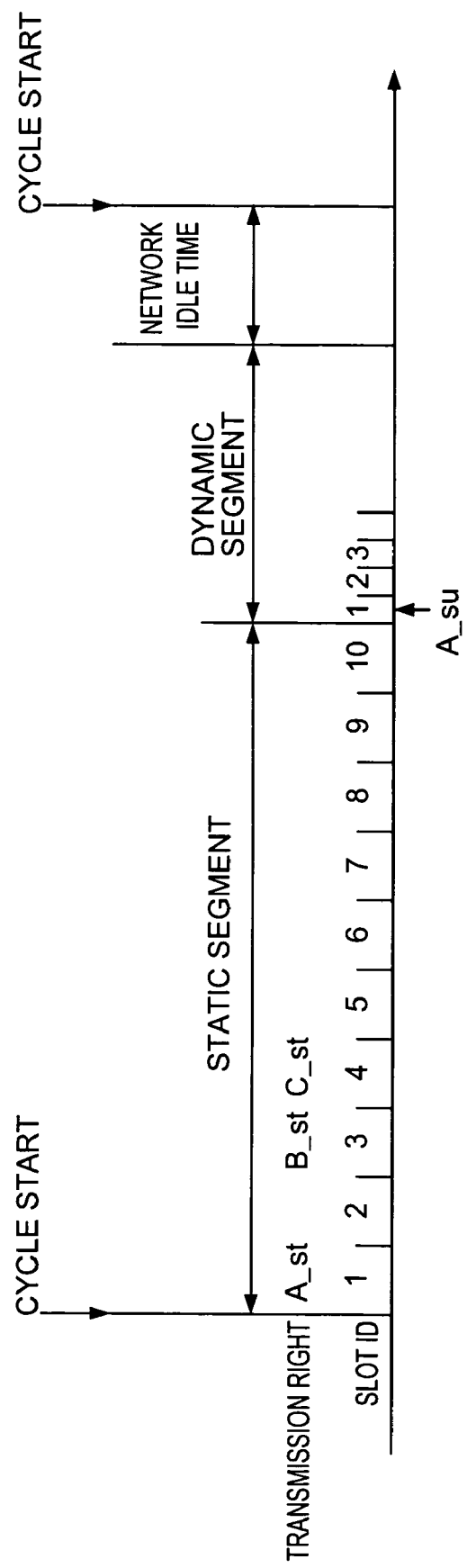
FIG. 23 is a diagram showing another example of the communication schedule in one cycle of the communication system according to the present invention.

FIGS. 21 and 22 show a case in which the clock synchronization with the network in which the terminals A, B, and C have already started to transmit the frames in the communication schedule shown in FIG. 23 is conducted with the terminal D as the integration node. All of the coldstart nodes transmit the startup frame in the time slot which is assigned in the static segment, and assigns the transmission right of the sub-startup frame in minislot ID=1 to one coldstart node (terminal A, leading integration node) defined in the coldstart nodes.

The leading integration node observes the transmission path 1, and confirms the frame transmission status of all the terminals which are listed in the member list. Then, in the case where the terminal that has not transmitted the frame is detected, the terminal A instructs the transmission of the sub-startup frame from the communication control means 21. The member list is obtained from the communication schedule.

A (a) in FIG. 21 shows a case in which the integration node (terminal D) has first received the startup frame that has been transmitted from the terminal A in the odd communication cycle ($2k+1$). In this case, the terminal D initializes the local time according to the startup frame A_st$2k+1$ and the sub-startup frame A_su$2k+1$ which are transmitted from the terminal A. The initialization of the local time is identical with the initialization of the local time in the startup phase described in the above-mentioned second embodiment, and therefore its description will be omitted.

A (b) in FIG. 21 shows a case in which the integration node (terminal D) has first received the startup frame that has been transmitted from the terminal B in the odd communication cycle ($2k+1$). In this case, the terminal D initializes the local time according to the startup frame B_st$2k+1$ which is transmitted from the terminal B and the sub-startup frame A_su$2k+1$ which is transmitted from the terminal A. The initialization of the local time is identical with the initialization of the local time in the startup phase described in the above-mentioned second embodiment.

In the case of (b) in FIG. 21, the terminal D initializes the local time according to the local times of the terminal A and the terminal B. It is presumed that the local times of the terminal A and the terminal B are small in error because the clock adjusted value is updated every two communication cycles. Also, the local time of the terminal A and the local time of the terminal B are synchronized with the global time, and when it is assumed that an error between the local time of the terminal A and the global time is D_A., and an error between the local time of the terminal B and the global time is D_B., an error D_D of the time and the global time which should be synchronized with each other by the terminal D is represented by the following expression:

When $D\_A > 0$ and $D\_B > 0$, $D\_D = \max(D\_A, D\_B)$

When $D\_A$ and $D\_B$ are different in sign, $D\_D = D\_A + D\_B$

When $D\_A < 0$ and $D\_B < 0$, $D\_D = \min(D\_A, D\_B)$

As a result, D_D becomes a time that is synchronized with the global time, and the local time can be initialized.

A (c) in FIG. 21 shows a case in which the terminal D has first received the startup frame that has been transmitted from the terminal C in the odd communication cycle ($2k+1$). The operation identical with that in the case of (b) in FIG. 21, and therefore its description will be omitted.

When the integration node has completely initialized the local time, the integration node adjusts the clock in the same manner as that in the above-mentioned FlexRay in the subsequent communication cycle (even communication cycle) or later. The detailed description of the clock adjustment will be omitted.

A (a) in FIG. 22 shows a case in which the integration node (terminal D) has first received the startup frame that has been transmitted from the terminal A in the even communication cycle ($2k$). In this case, the terminal D initializes the local time according to the startup frame A_st$2k$ and the sub-startup frame A_su$2k$ which are transmitted from the terminal A. The initialization of the local time is identical with the initialization of the local time in the startup phase described in the above-mentioned second embodiment, and therefore its description will be omitted.

A (b) in FIG. 22 shows a case in which the integration node (terminal D) has first received the startup frame that has been transmitted from the terminal A in the even communication cycle ($2k$). In this case, the terminal D initializes the local time according to the startup frame B_st$2k$ which is transmitted from the terminal B and the sub-startup frame A_su$2k$ which is transmitted from the terminal A. The initialization of the local time is identical with the initialization of the local time in the startup phase described in the above-mentioned second embodiment, and therefore its description will be omitted.

A (c) in FIG. 22 shows a case in which the terminal D has first received the startup frame that has been transmitted from the terminal C in the even communication cycle ($2k$). The operation identical with that in the case of (b) in FIG. 22, and therefore its description will be omitted.

Upon completion of the initialization of the local time, the integration node conducts the clock adjustment in the same manner as that in the above-mentioned general FlexRay. In the general FlexRay, as described above, because the processing related to the clock synchronization starts in the even communication cycle, in the subsequent odd communication cycle ($2k+1$), the integration node stands by without conducting the clock adjustment. Then, in the subsequent even communication cycle ($2k+2$) or later, the integration node conducts the clock adjustment in the same manner as that in the general FlexRay. The detailed description of the clock adjustment will be omitted.

As described above, the communication system is characterized in that the communication control means 21 defines the sub-startup frame as an event signal in the case where the communication portion of the event type which transmits the frame is disposed within the communication schedule in the case of the leading integration terminal, and instructs the transmission of the sub-startup frame in the case where there is a terminal that has not transmitted the frame. The period of time required for initializing the local time is equal (two cycles) to or shorter (one cycle) than that in the case of initializing the local time in the general FlexRay, thereby making it possible to reduce the period of time required for the integration into the network. In addition, because the transmission of the sub-startup frame starts as an event in the case where there exists the integration node (integration terminal) as described above, the transmission path 1 is not occupied by the transmission of the sub-startup frame in the case where there exists no integration node. For that reason, the use efficiency of the transmission path can be improved.

Seventh Embodiment

Figure 24:
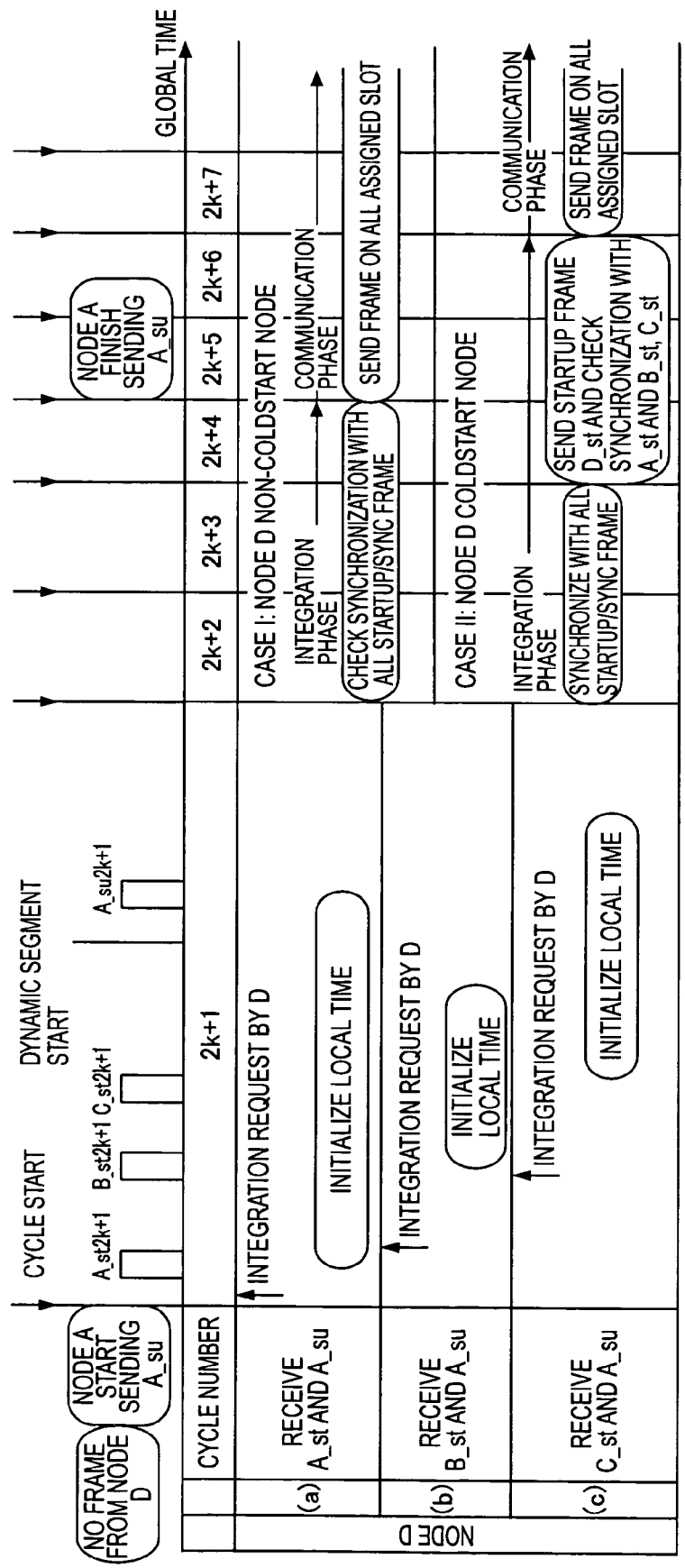
FIG. 24 is a timing chart showing an example of the communication cycle of the communication system according to a seventh embodiment of the present invention.

In a communication system according to this embodiment, as shown in FIG. 24, the communication control means 21 of a terminal that transmits the sub-startup frame observes the transmission path 1, and the transmission command of the sub-startup frame is completed when the frames which are transmitted from all of the terminals listed in the member list are detected.

As described above, the communication system is characterized in that, in the case where all of the terminals listed in the member list start to transmit the frames, the communication control means 21 completes the transmission command of the sub-startup frame. As a result, because a period of time which is occupied by the transmission of the sub-startup frame is limited, the use efficiency of the transmission path can be improved.

Eighth Embodiment

Figure 25:
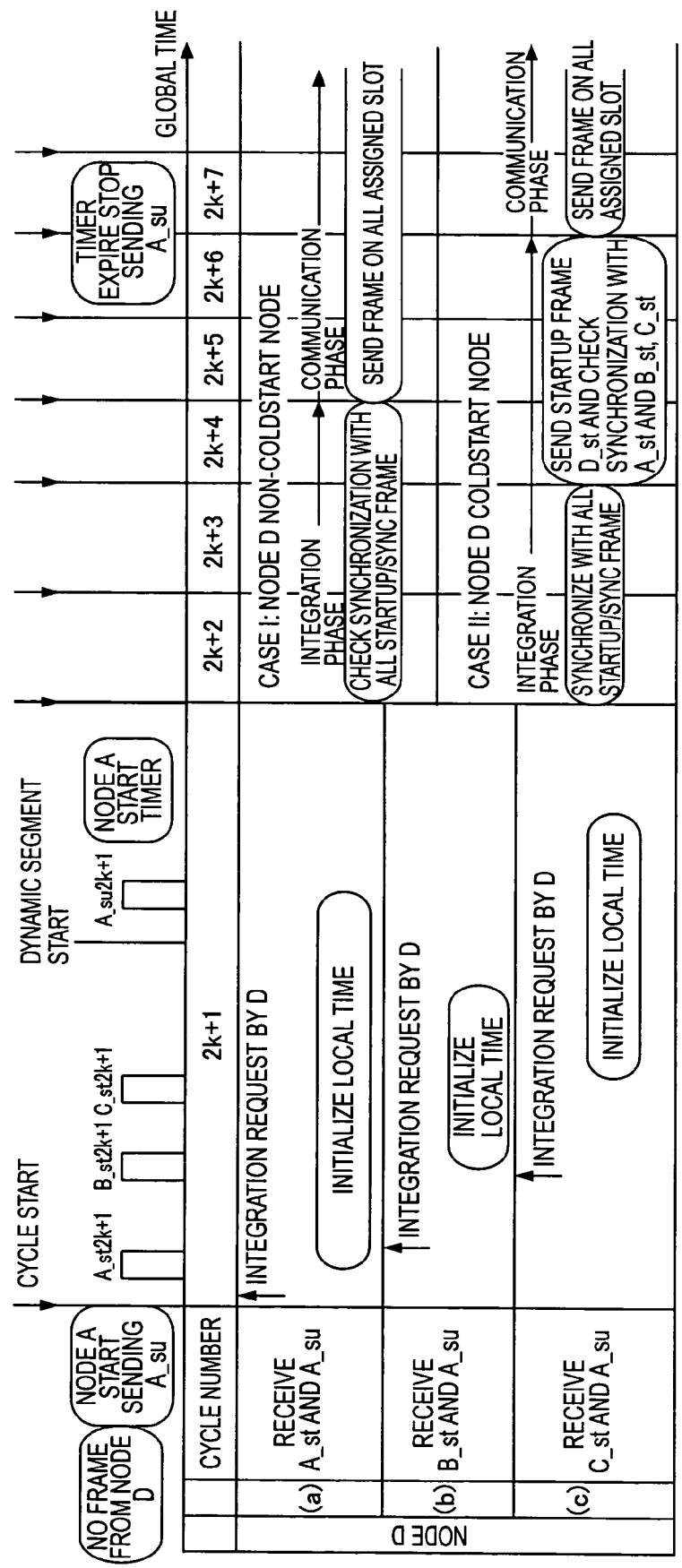
FIG. 25 is a timing chart showing another example of the communication cycle of the communication system according to an eighth embodiment of the present invention.

In a communication system according to this embodiment, as shown in FIG. 25, the communication control means 21 of a terminal that transmits the sub-startup frame sets a timer value after starting the transmission of the sub-startup frame, and completes the transmission command of the sub-startup frame when the timer expires.

As described above, the communication system is characterized in that the communication control means 21 completes the transmission command of the sub-startup frame a given period of time after starting to transmit the auxiliary start frame. With the above structure, a period of time during which the sub-startup frame is transmitted is limited, and in the case where the integration node (integration terminal) cannot achieve the initialization of the clock due to a trouble of the clock such as thermorunaway, a state where the leading coldstart node (main terminal) continuously transmits the sub-startup frame can be avoided.

Ninth Embodiment

Figure 26:
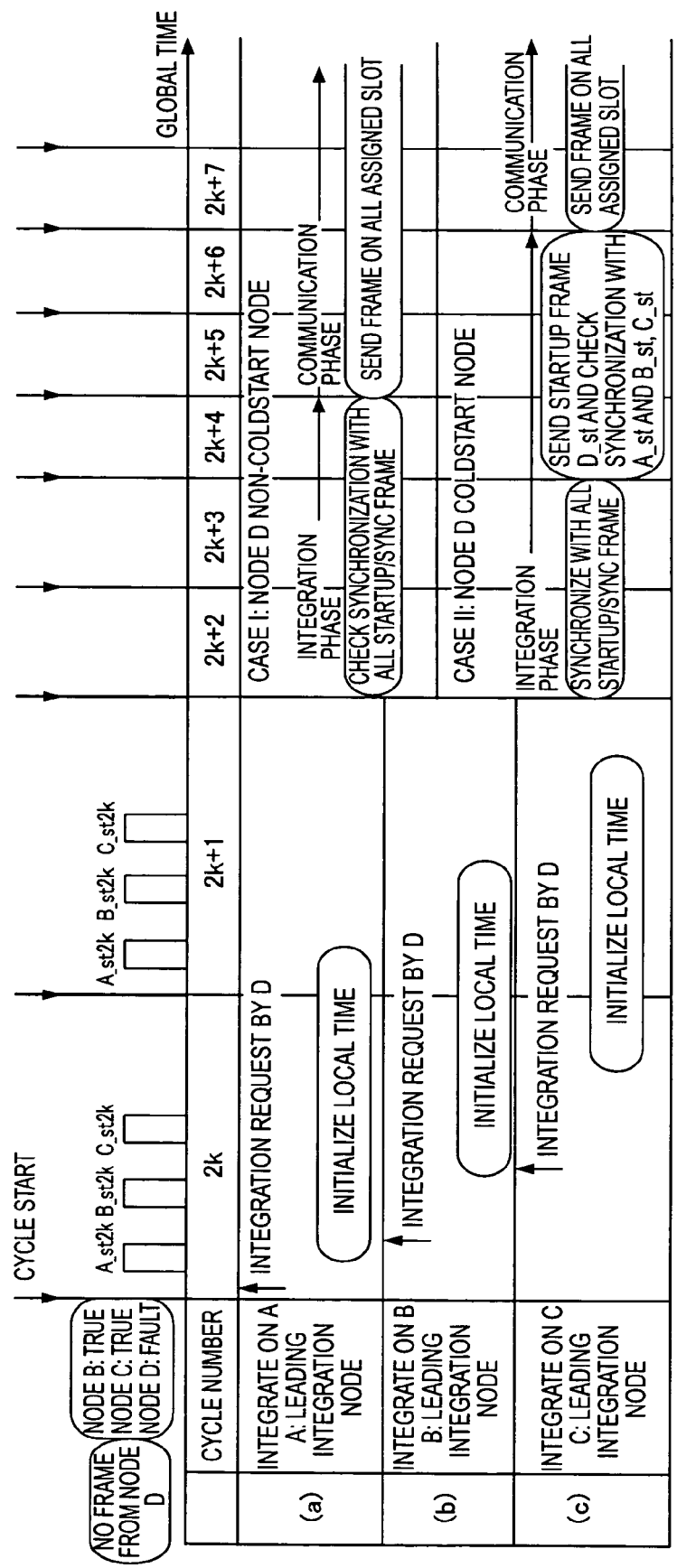
FIG. 26 is a timing chart showing an example of the communication cycle of the communication system according to a ninth embodiment of the present invention.

In a communication system according to this embodiment, as shown in FIG. 26, the communication control means 21 of a terminal that transmits the sub-startup frame sets a flag value with respect to the member list, and only in the case where the frame transmission is not detected from the terminal that is set with a flag, the sub-startup frame is transmitted.

As described above, only in the case where a specific terminal does not transmit the frame, the communication control means 21 that instructs the transmission of the sub-startup frame is used, thereby making it possible to transmit the sub-startup frame according to an importance of the integration node (integration terminal) on the network. As a result, the use efficiency of the transmission path can be improved.

Tenth Embodiment

Figure 27:
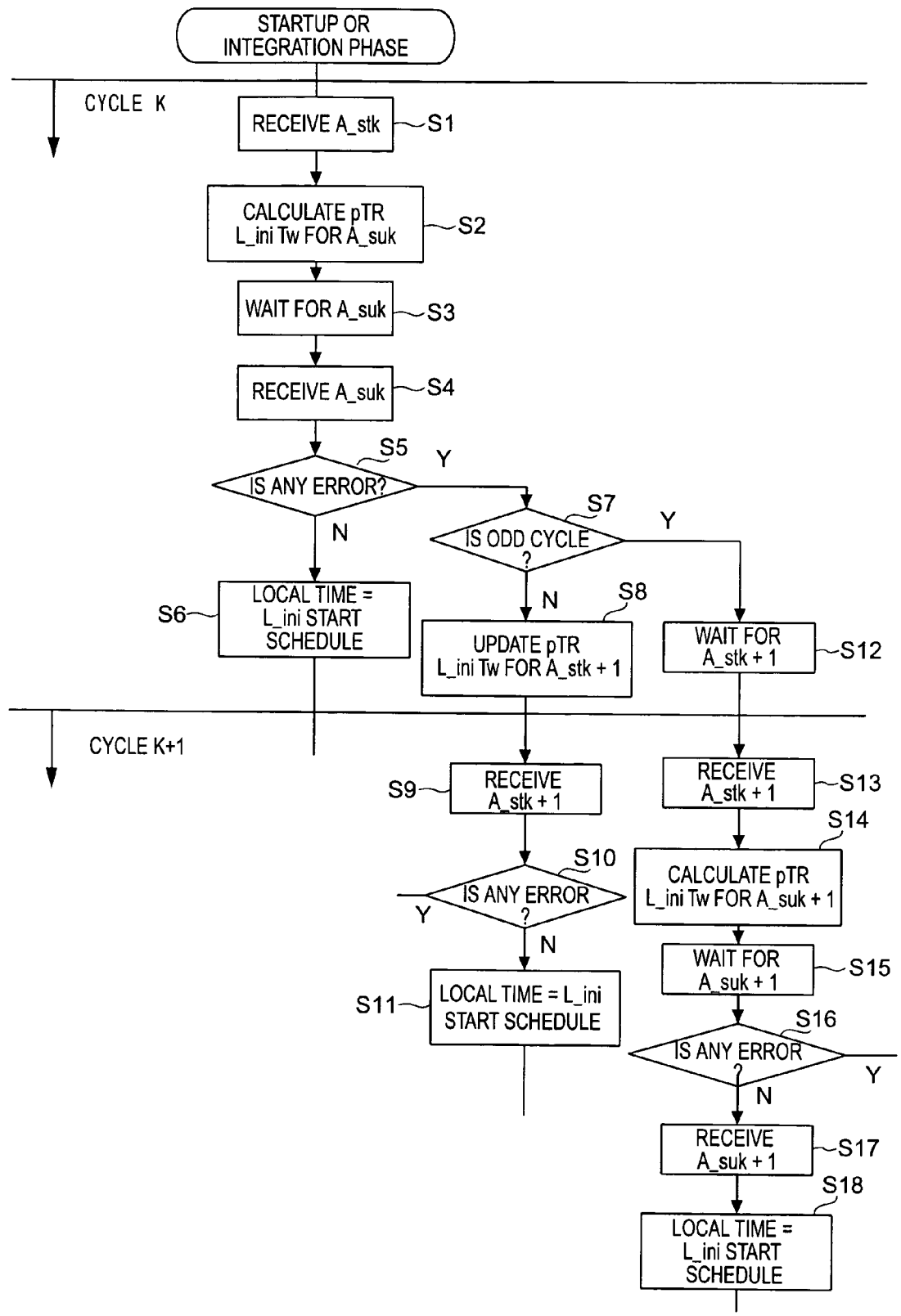
FIG. 27 is a flowchart for explaining the operation of the communication system according to a tenth embodiment of the present invention.

In a communication system according to this embodiment, as shown in FIG. 27, in the case where the integration node fails in receiving the sub-startup frame (Steps S1 to S5), when the present communication cycle (k) is an even communication cycle (Steps S7 to S11), the integration node calculates L_ini and Tw in the startup frame A_stk+1 of the subsequent communication cycle (k+1), and then initializes the local time in the same manner as that in the above-mentioned general FlexRay due to A_stk and A_stk+1 (Steps S8 to S11). On the other hand, in the case where the present communication cycle is an odd communication cycle, the integration node initializes the local time due to A_stk+1 and A_suk+1 (Steps S12 to S18).

As described above, the communication system is characterized in that, in the case of the integration terminal, when the communication control means 21 succeeds in receiving the startup frame that is transmitted by the leading terminal and fails in receiving the sub-startup frame, the communication control means 21 starts the communication schedule by the local time according to an initial value of the local time which is calculated by using the reception time of the start frame that has succeeded in the reception, and the reception time and the estimated reception time of the startup frame which is transmitted from the leading terminal in a communication cycle subsequent to the communication cycle that has succeeded in the reception of the startup frame, or the reception time of the startup frame that is transmitted from the leading terminal, the reception time and the estimated reception time of the sub-startup frame in the communication cycle subsequent to the communication cycle that has succeeded in the reception of the startup frame. The clock synchronizing means 25 calculates the initial value of the local time. Also, in the communication system, in the case of the integration terminal, when the communication control means 21 succeeds in receiving the startup frame that is transmitted by the leading integration terminal and fails in receiving the sub-startup frame, the communication control means 21 starts the communication schedule by the local time according to an initial value of the local time which is calculated by using the reception time of the start frame that has succeeded in the reception, and the reception time and the estimated reception time of the startup frame which is transmitted from the leading integration terminal in a communication cycle subsequent to the communication cycle that has succeeded in the reception of the startup frame, or the reception time of the startup frame that is transmitted from the leading integration terminal, the reception time and the estimated reception time of the sub-startup frame in the communication cycle subsequent to the communication cycle that has succeeded in the reception of the startup frame. The clock synchronizing means 25 calculates the initial value of the local time. When the integration node (integration terminal) is used, even in the case where the integration node fails in receiving the startup frame in the startup phase, the local time can be initialized in a period of time that is equal to or shorter than that in the general FlexRay.

Eleventh Embodiment

Figure 28:
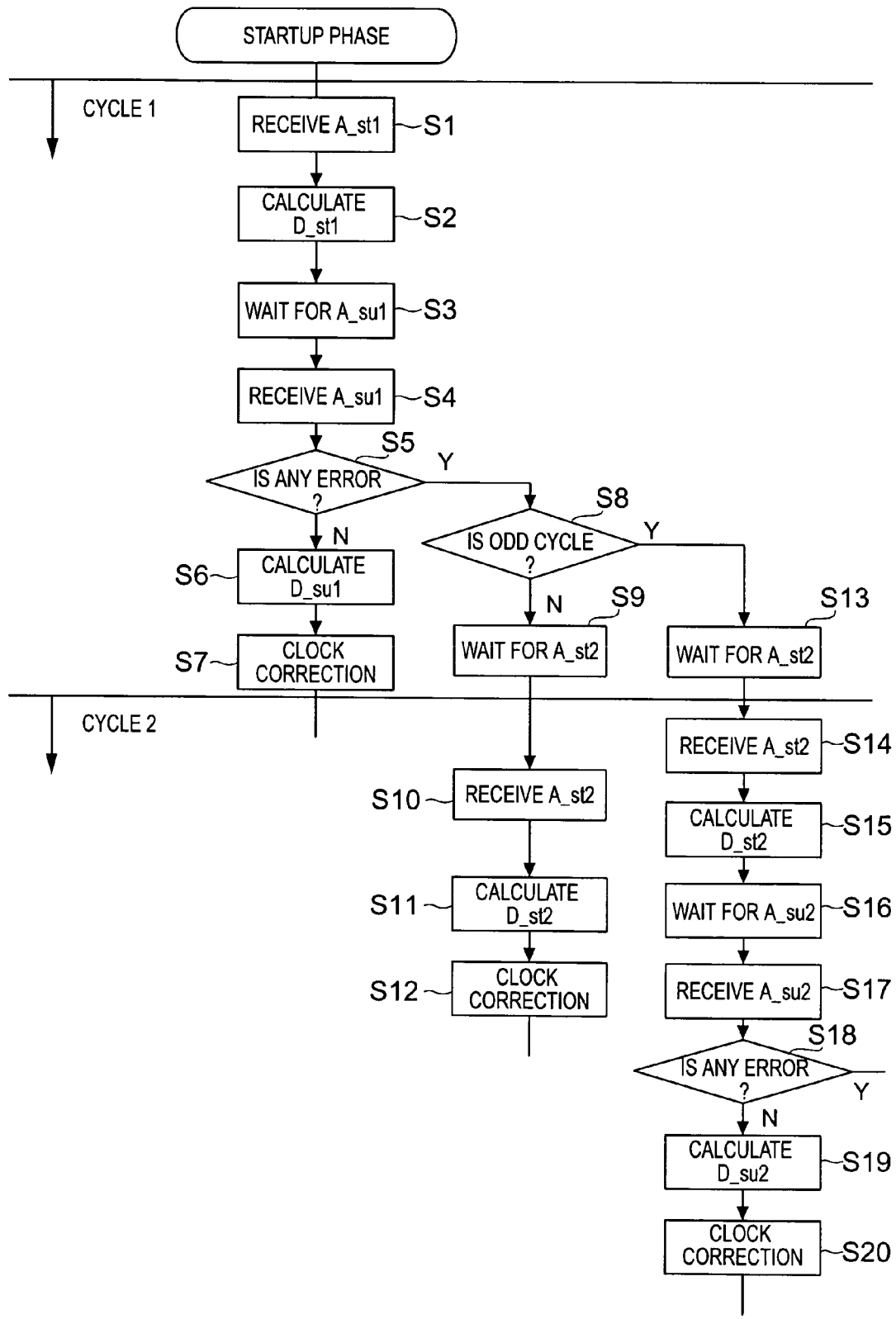
FIG. 28 is a flowchart for explaining the operation of the communication system according to an eleventh embodiment of the present invention.

In a communication system according to this embodiment, as shown in FIG. 28, in the case where the integration node fails in receiving the auxiliary start frame (Steps S1 to S5), when the present communication cycle is the even communication cycle (k), the initial clock adjustment is conducted in the same manner as that in the general FlexRay due to A_st1 and A_st2 (Steps S8 to S12). On the other hand, when the present communication cycle is the odd communication cycle, the initial clock adjustment is conducted by the startup frame and the sub-startup frame in the subsequent communication cycle (Steps S13 to S19).

As described above, the communication system is characterized in that, in the case of the integration terminal, when the communication control means 21 succeeds in receiving the startup frame that is transmitted by the leading terminal and fails in receiving the sub-startup frame, the clock synchronizing means 25 adjusts the clocks of the local time and the global time according to the reception time and the estimated reception time of the start frame that has succeeded in the reception, and the reception time and the estimated reception time of the startup frame which is transmitted from the leading terminal in a communication cycle subsequent to the communication cycle that has succeeded in the reception of the startup frame, or the respective reception times and estimated reception times of the startup frame and the sub-startup frame which are transmitted from the leading terminal in the communication cycle subsequent to the communication cycle that has succeeded in the reception of the startup frame. With the above structure, even in the case where the communication control means 21 fails in receiving the sub-startup frame, the communication control means 21 is capable of conducting the initial clock adjustment in a period of time that is equal to or shorter than that in the conventional art.

Twelfth Embodiment

In a communication system according to this embodiment, in the subsequent communication cycle where the communication schedule starts due to the local time, the integration node calculates a difference between the respective reception time and estimated reception time of the startup frame and the sub-startup frame which are transmitted from a terminal (leading integration node) referred to in the initialization of the local time, and then adjusts the local time in the same manner as that in the initial clock adjustment.

As described above, the communication system is characterized in that, in the case of the integration terminal, the communication control means 21 confirms the validity of the initial value of the local time after starting the communication schedule due to the local time. In the case where the initial value of the local time is an improper value, the clock synchronizing means 25 adjusts the initial value of the local time. As a result, as shown in FIG. 22, in a period of time (cycle 2k+1) during which the integration node stands by until the even communication cycle starts, the local time of the integration node (integration terminal) can be synchronized with the local time of the leading integration node (leading integration terminal) with a higher precision.

What is claimed is:

1. A communication system in which a plurality of terminals are connected to each other through a transmission path so as to establish a network,
   each of the terminals comprising:
   a transmitting section for transmitting a frame;
   a receiving section for receiving the frame;
   clock means for generating a local time inherent to the terminal;
   clock synchronizing means for calculating a reception time of the frame, an estimated reception time of the frame, and an initial value of the local time, and for adjusting a clock;
   storing means for storing a communication schedule that defines a transmission and reception procedure of the frame within a communication cycle of a given period and setting information related to the communication schedule; and
   communication control means for controlling the communication operation of the terminal by the transmitting section and the receiving section on the basis of the local time and the communication schedule,
   wherein the communication control means in each of the terminals operates as a leading terminal that leads the communication schedule in a case where the terminal first starts the communication among the plurality of terminals, and operates as an integration terminal that conducts the integration into the network in other cases in a startup phase where the network is established, wherein in a case where the terminal is the leading terminal, the communication control means in each of the terminals transmits the sub-startup frame in the same communication cycle at a timing when the estimated reception time can be calculated due to the startup frame for the global time reference and the communication schedule stored in the integration terminal at a transmission timing defined by the communication schedule in advance, after starting the communication schedule with the local time as the global time used on the network, wherein in a case where the terminal is the integration terminal, the communication control means in each of the terminals receives the startup frame and the sub-startup frame, and starts the communication schedule by the local time according to an initial value of the local time calculated from the reception time of the startup frame, the reception time of the sub-startup frame, and the estimated reception time, and wherein the clock synchronizing means calculates the initial value of the local time according to the reception time of the startup frame, and the reception time and the estimated reception time of the sub-startup frame.

2. The communication system according to claim 1, wherein in the case of the leading terminal, when a communication portion of an event type which transmits the frame is disposed within the communication schedule, the sub-startup frame is defined to the communication portion of the event type, and when the communication portion is in a startup phase of the communication schedule, the communication control means instructs the transmission of the auxiliary start frame.

3. The communication system according to claim 2, wherein the communication control means completes a transmission command of the sub-startup frame in a case where the transmission of the frame starts from the leading integration terminal after starting to transmit the sub-startup frame.

4. The communication system according to claim 2, wherein the communication control means completes the transmission command of the sub-startup frame when a given period of time elapses after starting to transmit the sub-startup frame.

5. The communication system according to claim 1, wherein in the case of the integration terminal, when the communication control means succeeds in receiving the startup frame that is transmitted by the leading terminal and fails in receiving the sub-startup frame, the communication control means starts the communication schedule by the local time according to an initial value of the local time which is calculated by using one of: the reception time of the start frame that has succeeded in the reception, and the reception time and the estimated reception time of the startup frame that is transmitted from the leading terminal in a communication cycle subsequent to the communication cycle that has succeeded in the reception of the startup frame; and the reception time of the startup frame that is transmitted from the leading terminal in the communication cycle subsequent to the communication cycle that has succeeded in the reception of the startup frame, and the reception time and the estimated reception time of the sub-startup frame, and wherein the clock synchronizing means calculates the initial value of the local time.

6. The communication system according to claim 1, wherein in the case of the integration terminal, the communication control means confirms the validity of the initial value of the local time after starting the communication schedule due to the local time, and in a case where the initial value of the local time is an improper value, the clock synchronizing means adjusts the initial value of the local time.

7. A communication system in which a plurality of terminals are connected to each other through a transmission path so as to establish a network, each of the terminals comprising:
a transmitting section for transmitting a frame;
a receiving section for receiving the frame;
clock means for generating a local time inherent to the terminal;
clock synchronizing means for calculating a reception time of the frame, an estimated reception time of the frame, and an initial value of the local time, and for adjusting a clock;
storing means for storing a communication schedule that defines a transmission and reception procedure of the frame within a communication cycle of a given period and setting information related to the communication schedule; and
communication control means for controlling the communication operation of the terminal by the transmitting section and the receiving section on the basis of the local time and the communication schedule, wherein the communication control means in each of the terminals operates as a leading terminal that leads the communication schedule in a case where the terminal first starts the communication among the plurality of terminals, and operates as an integration terminal that conducts the integration into the network in other cases in a startup phase where the network is established, wherein in a case where the terminal is the leading terminal, the communication control means in each of the terminals transmits the sub-startup frame in the same communication cycle at a timing when the estimated reception time can be calculated due to the startup frame for the global time reference and the communication schedule stored in the integration terminal at a transmission timing defined by the communication schedule in advance, after starting the communication schedule with the local time as the global time used on the network, wherein in a case where the terminal is the integration terminal, the communication control means in each of the terminals starts the communication schedule by the local time, and wherein the clock synchronizing means receives the startup frame and the sub-startup frame and performs communication adjustment for the local time and the global time based on the reception time and the estimated reception time of the startup frame and the sub-startup frame.

8. The communication system according to claim 7, wherein in the case of the leading terminal, when a communication portion of an event type which transmits the frame is disposed within the communication schedule, the sub-startup frame is defined to the communication portion of the event type, and when the communication portion is in a startup phase of the communication schedule, the communication control means instructs the transmission of the auxiliary start frame.

9. The communication system according to claim 8, wherein the communication control means completes a transmission command of the sub-startup frame in a case where the transmission of the frame starts from the leading integration terminal after starting to transmit the sub-startup frame.

10. The communication system according to claim 8, wherein the communication control means completes the transmission command of the sub-startup frame when a given period of time elapses after starting to transmit the sub-startup frame.

11. The communication system according to claim 7, wherein in the case of the integration terminal, when the communication control means succeeds in receiving the startup frame that is transmitted by the leading terminal and fails in receiving the sub-startup frame, the clock synchronizing means adjusts the clocks of the local time and the global time according to one of: the reception time and the estimated reception time of the start frame that has succeeded in the reception, and the reception time and the estimated reception time of the startup frame that is transmitted from the leading terminal in a communication cycle subsequent to the communication cycle that has succeeded in the reception of the startup frame; and the respective reception times and estimated reception times of the startup frame and the sub-startup frame that are transmitted from the leading terminal in the communication cycle subsequent to the communication cycle that has succeeded in the reception of the startup frame.

12. A communication system in which a plurality of terminals are connected to each other through a transmission path so as to establish a network,
each of the terminals comprising:
a transmitting section for transmitting a frame;
a receiving section for receiving the frame;
clock means for generating a local time inherent to the terminal;
clock synchronizing means for calculating a reception time of the frame, an estimated reception time of the frame, and an initial value of the local time, and for adjusting a clock;
storing means for storing a communication schedule that defines a transmission and reception procedure of the frame within a communication cycle of a given period and setting information related to the communication schedule; and
communication control means for controlling the communication operation of the terminal by the transmitting section and the receiving section on the basis of the local time and the communication schedule;
wherein the communication control means in each of the terminals obtains a member list indicative of all of the terminals which can be connected to the network from the communication schedule, and in a case where parts of the terminals listed in the member list do not transmit the frame, at least one of the terminals that have already transmitted the frames functions as the leading integration terminal that leads the integration into the network, and the terminals that do not start to transmit the frames function as the integration terminals;
wherein in a case where the terminal is the leading integration terminal, the communication control means in each of the terminals transmits the startup frame at a transmission timing that is defined by the communication schedule in advance, and the sub-startup frame at a timing that allows the estimated reception time to be calculated by the communication schedule stored by the integration terminal in the same communication cycle, respectively,
wherein in a case where the terminal is the integration terminal, the communication control means in each of the terminals receives a pair of startup frame and auxiliary startup frame from the startup frames and the sub-startup frames that are transmitted from the plural terminals, and starts the communication schedule by the local time according to an initial value of the local time which are calculated according to the reception time of the startup frame, the reception time and the estimated reception time of the sub-startup frame, and
wherein the clock synchronizing means calculates the initial value of the local time according to the reception time of the startup frame, the reception time and the estimated reception time of the sub-startup frame.

13. The communication system according to claim 12, wherein the communication control means defines the sub-startup frame as an event signal in a case where the communication portion of the event type which transmits the frame is disposed within the communication schedule in the case of the leading integration terminal, and instructs the transmission of the sub-startup frame in a case where there is a terminal that has not transmitted the frame.

14. The communication system according to claim 13, wherein the communication control means completes the transmission command of the sub-startup frame in a case where all of the terminals listed in the member list start to transmit the frames.

15. The communication system according to claim 13, wherein the communication control means completes the transmission command of the sub-startup frame when a given period of time elapses after starting to transmit the sub-startup frame.

16. The communication system according to claim 13, wherein the communication control means instructs the transmission of the sub-startup frame only in a case where a specific terminal does not conduct the transmission of the frame.

17. The communication system according to claim 12, wherein in the case of the integration terminal, when the communication control means succeeds in receiving the startup frame that is transmitted by the leading integration terminal and fails in receiving the sub-startup frame, the communication control means starts the communication schedule by the local time according to an initial value of the local time which is calculated by using one of: the reception time of the startup frame that has succeeded in the reception, and the reception time and the estimated reception time of the startup frame that is transmitted from the leading integration terminal in a communication cycle subsequent to the communication cycle that has succeeded in the reception of the startup frame; and the reception time of the startup frame that is transmitted from the leading integration terminal in the communication cycle subsequent to the communication cycle that has succeeded in the reception of the startup frame, and the reception time and the estimated reception time of the sub-startup frame, and
wherein the clock synchronizing means calculates the initial value of the local time.

18. The communication system according to claim 12, wherein in the case of the integration terminal, the communication control means confirms the validity of the initial value of the local time after starting the communication schedule due to the local time, and in a case where the initial value of the local time is an improper value, the clock synchronizing means adjusts the initial value of the local time.

* * * * *